United States Patent
Geissele

(10) Patent No.: US 10,393,460 B2
(45) Date of Patent: Aug. 27, 2019

(54) SEAR MECHANISM FOR A FIREARM

(71) Applicant: WHG Properties, LLC, North Wales, PA (US)

(72) Inventor: William H. Geissele, Lower Gwynedd, PA (US)

(73) Assignee: WHG Properties, LLC, North Wales, PA (US)

( * ) Notice: Subject to any disclaimer, the term of this patent is extended or adjusted under 35 U.S.C. 154(b) by 0 days.

(21) Appl. No.: 15/252,732

(22) Filed: Aug. 31, 2016

(65) Prior Publication Data

US 2016/0370140 A1 Dec. 22, 2016

Related U.S. Application Data

(60) Division of application No. 14/527,143, filed on Oct. 29, 2014, now Pat. No. 9,562,731, which is a continuation-in-part of application No. 29/500,695, filed on Aug. 27, 2014, now Pat. No. Des. 745,943.

(51) Int. Cl.
| | |
|---|---|
| *F41A 19/12* | (2006.01) |
| *F41A 19/14* | (2006.01) |
| *F41A 19/10* | (2006.01) |
| *B23H 7/02* | (2006.01) |
| *B23H 9/00* | (2006.01) |

(52) U.S. Cl.
CPC .............. *F41A 19/12* (2013.01); *B23H 7/02* (2013.01); *B23H 9/00* (2013.01); *F41A 19/10* (2013.01); *F41A 19/14* (2013.01)

(58) Field of Classification Search
CPC .......... F41A 19/10; F41A 19/12; F41A 19/14; F41A 19/15; F41A 19/42; F41A 19/45; B23H 7/02; B23H 9/00

USPC ....................................................... 42/69.01
See application file for complete search history.

(56) References Cited

U.S. PATENT DOCUMENTS

| | | | | |
|---|---|---|---|---|
| 1,340,127 | A | * | 5/1920 | Welch ..................... F41C 23/10 42/71.01 |
| 1,386,247 | A | * | 8/1921 | Fordyce ................... F41A 9/76 42/69.01 |
| 2,654,794 | A | | 10/1953 | Zaugg |
| 2,671,287 | A | * | 3/1954 | Hayes ..................... F41A 19/09 42/69.01 |
| 2,928,892 | A | | 3/1960 | Ensign |
| 3,091,878 | A | * | 6/1963 | Savioli ..................... F41A 19/09 42/65 |

(Continued)

FOREIGN PATENT DOCUMENTS

EP 2739862 6/2014

OTHER PUBLICATIONS

Tavor Sar, Semi-automatic rifle Operator manual, printed Jul. 18, 2013, 96 pp.

(Continued)

*Primary Examiner* — Michelle Clement
(74) *Attorney, Agent, or Firm* — Fox Rothschild LLP

(57) ABSTRACT

A sear mechanism for a firearm includes a trigger element having one or more contact surfaces on which one or more movable or pivotable components of the sear mechanism selectively contacts or slides. In some embodiments, the trigger element is made by producing an intermediate workpiece of the trigger element by a manufacturing process, and electric discharge machining the intermediate workpiece of the trigger element to provide the contact surfaces.

12 Claims, 23 Drawing Sheets

(56) References Cited

U.S. PATENT DOCUMENTS

| | | | | |
|---|---|---|---|---|
| 3,269,045 | A * | 8/1966 | McGaughey | F41A 17/46 42/65 |
| 3,488,488 | A * | 1/1970 | Crouch | F41G 1/35 362/110 |
| 3,611,872 | A * | 10/1971 | Davis | F41A 3/38 89/136 |
| 3,707,796 | A * | 1/1973 | Bielfeldt | F41A 17/56 42/69.02 |
| 3,950,876 | A * | 4/1976 | Wild | F41A 19/32 42/69.02 |
| 4,428,138 | A * | 1/1984 | Seecamp | F41A 19/48 42/70.02 |
| 4,452,001 | A * | 6/1984 | Compton | F41A 3/10 42/23 |
| 4,463,654 | A * | 8/1984 | Barnes | F41A 19/09 42/74 |
| 4,499,684 | A * | 2/1985 | Repa | F41A 19/17 42/69.01 |
| 4,523,510 | A * | 6/1985 | Wilhelm | F41A 19/33 89/141 |
| 4,545,143 | A * | 10/1985 | Schultz | F41A 19/21 42/42.01 |
| 4,601,123 | A * | 7/1986 | Swearengen | F41A 11/02 42/70.01 |
| H000144 | H | 10/1986 | Savioli | |
| 4,648,190 | A * | 3/1987 | Allen | F41A 3/10 42/23 |
| 4,677,781 | A * | 7/1987 | Lee | F41A 11/02 42/70.01 |
| 4,679,487 | A * | 7/1987 | Houseman | F41A 19/33 42/75.03 |
| 4,693,170 | A * | 9/1987 | Atchisson | F41A 3/72 89/149 |
| 4,709,617 | A * | 12/1987 | Anderson | F41A 3/76 89/157 |
| 4,726,136 | A * | 2/1988 | Dornaus | F41A 9/53 42/7 |
| 4,930,399 | A * | 6/1990 | Trevor, Jr. | F41A 3/46 89/185 |
| 4,932,148 | A * | 6/1990 | Barrett | F41A 19/10 42/18 |
| 4,962,606 | A * | 10/1990 | Pozzi | F41A 17/82 42/66 |
| 4,983,803 | A | 1/1991 | Pringle | |
| 5,349,773 | A * | 9/1994 | Sprangers | F41A 19/14 42/42.02 |
| 5,417,002 | A * | 5/1995 | Guerra | F41C 23/16 42/72 |
| 5,501,134 | A * | 3/1996 | Milazzo | F41A 19/45 42/69.03 |
| 5,615,507 | A * | 4/1997 | French | F41A 17/28 42/69.02 |
| 5,697,178 | A * | 12/1997 | Haskell | F41A 17/58 42/70.04 |
| 5,852,270 | A | 12/1998 | Holkeboer | |
| 6,131,324 | A * | 10/2000 | Jewell | F41A 19/16 42/69.03 |
| 6,217,000 | B1 | 4/2001 | Younie | |
| 6,412,206 | B1 * | 7/2002 | Strayer | F41A 19/12 42/69.03 |
| 6,722,072 | B1 * | 4/2004 | McCormick | F41A 19/10 42/69.03 |
| 6,760,991 | B1 | 7/2004 | Gentry | |
| 6,772,548 | B1 * | 8/2004 | Power | F41A 19/10 42/69.03 |
| D556,290 | S | 11/2007 | Swan | |
| 7,331,136 | B2 * | 2/2008 | Geissele | F41A 19/16 42/69.03 |
| D586,875 | S | 2/2009 | Swan | |
| D588,672 | S | 3/2009 | Swan | |
| 7,600,338 | B2 * | 10/2009 | Geissele | F41A 19/10 42/69.03 |
| 7,854,084 | B1 * | 12/2010 | Rutherford | F41A 19/10 42/69.01 |
| D641,826 | S | 7/2011 | Larsson | |
| 8,069,602 | B2 | 12/2011 | Geissele | |
| 8,074,393 | B2 | 12/2011 | Geissele | |
| 8,079,169 | B2 * | 12/2011 | Gregg | F41A 3/66 42/71.01 |
| 8,220,193 | B1 * | 7/2012 | Lynch | F41A 17/48 42/70.08 |
| 8,443,536 | B1 | 5/2013 | Geissele | |
| 8,782,940 | B1 * | 7/2014 | Morris | F41A 11/02 42/69.01 |
| D721,781 | S | 1/2015 | Larsson | |
| D728,729 | S | 5/2015 | Geissele | |
| 9,046,313 | B1 | 6/2015 | Lutton | |
| 9,140,510 | B1 | 9/2015 | Muska | |
| 9,194,639 | B1 * | 11/2015 | Malheiros | F41A 19/32 |
| 9,203,054 | B2 | 12/2015 | Hirasawa | |
| D752,012 | S | 3/2016 | Takahata | |
| 9,388,517 | B2 | 7/2016 | Lilbum | |
| 9,410,760 | B2 * | 8/2016 | Siddle | F41A 19/12 |
| 9,500,834 | B2 | 11/2016 | Wu | |
| D774,158 | S | 12/2016 | Cheng | |
| D777,285 | S | 1/2017 | Bender | |
| D781,987 | S * | 3/2017 | Geissele | D22/108 |
| D783,112 | S * | 4/2017 | Geissele | D22/108 |
| D783,759 | S * | 4/2017 | Geissele | D22/108 |
| 9,618,289 | B1 * | 4/2017 | Geissele | F41A 19/46 |
| 9,644,913 | B2 * | 5/2017 | Dextraze | F41A 19/10 |
| 9,677,846 | B1 * | 6/2017 | Vankeuren, III | F41C 23/20 |
| 9,733,034 | B1 * | 8/2017 | Viani | F41A 19/45 |
| 2004/0244255 | A1 | 12/2004 | Sirois | |
| 2005/0183311 | A1 * | 8/2005 | Diaz | F41A 19/16 42/69.01 |
| 2005/0246933 | A1 | 11/2005 | McGarry | |
| 2006/0086031 | A1 | 4/2006 | Geissele | |
| 2007/0051236 | A1 | 3/2007 | Groves | |
| 2009/0183414 | A1 | 7/2009 | Geissele | |
| 2011/0079137 | A1 * | 4/2011 | Audibert | F41A 19/10 89/136 |
| 2011/0167696 | A1 * | 7/2011 | Gangl | F41A 17/46 42/69.03 |
| 2013/0185975 | A1 * | 7/2013 | Johnson | F41A 19/09 42/69.02 |
| 2014/0075803 | A1 * | 3/2014 | Muller | F41A 11/02 42/16 |
| 2014/0075812 | A1 * | 3/2014 | Johnson | F41A 19/08 42/69.01 |
| 2014/0246003 | A1 | 9/2014 | Lipowski | |
| 2014/0259845 | A1 * | 9/2014 | Johnson | F41A 19/09 42/69.01 |
| 2015/0153126 | A1 | 6/2015 | Bender | |
| 2015/0193980 | A1 | 7/2015 | Pedley | |
| 2015/0241156 | A1 | 8/2015 | Alicea | |
| 2015/0253095 | A1 | 9/2015 | Wilson | |
| 2015/0338181 | A1 * | 11/2015 | McAlister | F41A 19/10 42/6 |
| 2016/0018176 | A1 * | 1/2016 | Fellows | F41A 19/02 42/69.03 |
| 2016/0047615 | A1 * | 2/2016 | Tubb | F41A 17/56 42/69.01 |
| 2016/0327708 | A1 | 11/2016 | Liles | |

OTHER PUBLICATIONS

Infinity Firearms; Infinity Products: Trigger Group; Oct. 29, 2014; 6 pp.

* cited by examiner

SEAR MECHANISM FOR A FIREARM

CROSS-REFERENCE TO RELATED APPLICATION(S)

This application is a divisional of U.S. patent application Ser. No. 14/527,143 filed Oct. 29, 2014 (now U.S. Pat. No. 9,562,731), which is a continuation-in-part of U.S. patent application Ser. No. 29/500,695, filed on Aug. 27, 2014 (now U.S. Pat. No. D745,943), the disclosures of all of which are hereby incorporated by reference in their entireties.

BACKGROUND

A trigger mechanism actuates the firing sequence of a firearm. The trigger mechanism typically includes a lever or button actuated by the index finger. In addition, the trigger mechanism includes several mechanical components that engage and interact with each other to actuate a firing mechanism of the firearm.

The operation of the trigger mechanism has an impact on the shooting accuracy of a firearm. Accuracy can be reduced if too much force is required to pull back the trigger. Additionally, a rough, uneven, or unpredictable hammer release point can also result in reduced accuracy and may lead to frustration with or distrust of a firearm.

SUMMARY

In general terms, this disclosure is directed to a sear mechanism for a firearm. In one possible configuration and by non-limiting example, the sear mechanism includes a trigger element having one or more contact surfaces on which one or more movable or pivotable components of the sear mechanism contacts or slides. In some embodiments, the contact surfaces are made using an electric discharge machining process. Various aspects are described in this disclosure, which include, but are not limited to, the following aspects.

In one aspect, a method for manufacturing a trigger element of a sear mechanism for a firearm is provided. The method may include producing an intermediate workpiece of the trigger element by a manufacturing process; and electric discharge machining the intermediate workpiece of the trigger element to provide at least one contact surface onto which at least one pivotable element of the sear mechanism selectively contacts.

In another aspect, a sear mechanism for a firearm is provided. The sear mechanism may include a housing configured to be detachably mounted in the firearm; a trigger element pivotally connected to the housing and connected to a trigger through a trigger rod, the trigger rod disposed within the firearm, the trigger element comprising: a trigger biasing mechanism configured to bias the trigger element relative to the housing; a trigger sear including a sear contact surface produced by electric discharge machining; the disconnector pad including a disconnector contact surface produced by electric discharge machining; a disconnector element disposed in the housing and pivotally connected to at least one of the housing and the trigger element, the disconnector element comprising: a trigger element contact portion arranged at a first end of the disconnector element and configured to selectively contact the disconnector pad of the trigger element; a hammer sear contact face arranged at a second end of the disconnector element; and a disconnector biasing mechanism configured to bias the disconnector element relative to the trigger element such that the trigger element contact portion is biased to contact the disconnector pad; a hammer element disposed in the housing and configured to pivot between a cocked position and a released position, the hammer element comprising: a hammer biasing mechanism configured to bias the hammer element to the released position; and a hammer sear having a first sear edge and a second sear edge, the first sear edge configured to be selectively contact the sear contact surface of the trigger sear and engaged with the trigger sear in the cocked position, and the second sear edge configured to selectively contact the hammer sear contact face of the disconnector element, wherein at least one of the trigger element and the disconnector element is configured to pivot against resistance of at least one of the trigger biasing mechanism and the disconnector biasing mechanism as the trigger is pulled, and wherein the first sear edge of the hammer sear is engaged to the trigger sear of the trigger element in the cocked position, and is released from the trigger sear of the trigger element in the released position to cause the hammer element to rotate by force of the hammer biasing mechanism and strike a firing pin of the firearm.

In yet another aspect, a trigger element for production of a sear mechanism for a firearm is provided. The trigger element produced by a process including: producing an intermediate workpiece of the trigger element by a manufacturing process; and electric discharge machining the intermediate workpiece of the trigger element to provide at least one contact surface onto which at least one pivotable element of the sear mechanism selectively contacts.

DETAILED DESCRIPTION

Figure 1:
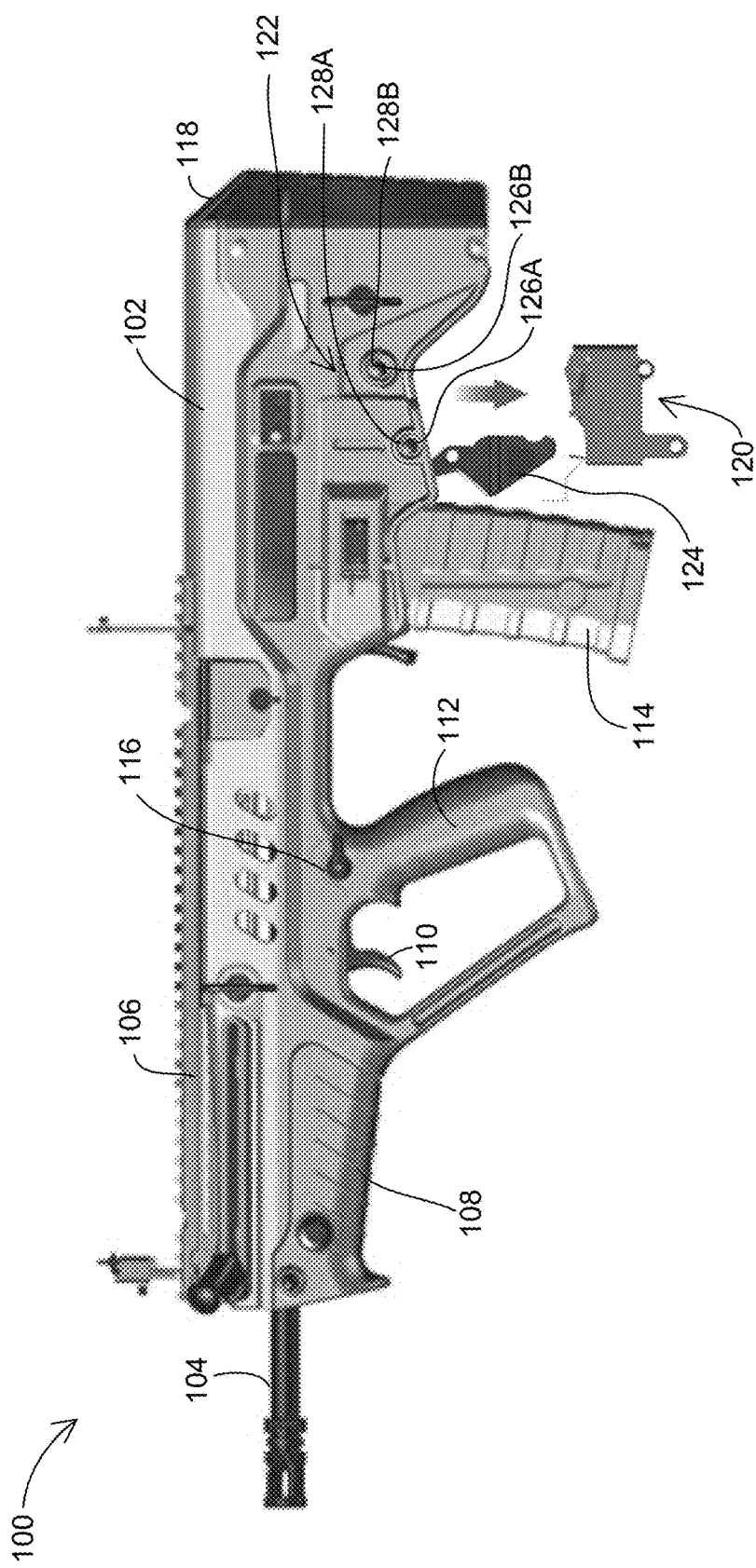
FIG. 1 is a schematic side view of an example firearm.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic side view of an example firearm 100. The firearm 100 generally includes a receiver body 102, a barrel assembly 104, a rail assembly 106, a foregrip 108, a trigger 110, a pistol grip 112, a magazine 114, a safety assembly 116, a butt assembly 118, a sear mechanism 120, a sear locking mechanism 122, and a bolt carrier stop lever 124.

The firearm 100 can be of a variety of types. Examples of the firearm 100 include handguns, rifles, shotguns, carbines, personal defense weapons, semi-automatic rifles, and assault rifles. In at least one embodiment, the firearm 100 is the "Tavor Assault Rifle—21st Century" ("TAR-21" or simply Tavor) by Israel Military Industries, or one of its variants, such as GTAR-21, CTAR-21, STAR-21, Micro TAR-21 (X95), Zittara, Semi-automatic TC-21, 7.62 NATO X95, 5.45 Russian X95, and Tavor SAR.

The receiver body 102 is configured to house a firing mechanism and associated components as found in, for example, Tavor type rifles and their variants. The firing mechanism typically includes a trigger mechanism 140 including the sear mechanism 120, which is described and illustrated in more detail with reference to FIG. 2. Further, the receiver body 102 defines an internal cavity configured to receive a bolt assembly 142 (FIG. 2). The bolt assembly 142 is slidably disposed in the cavity for axially reciprocating recoil movement therein.

The barrel assembly 104 is configured to be installed to the receiver body 102 and operates to provide a path to release an explosion gas and propel a projectile therethrough.

The rail assembly 106 is installed to the receiver body 102 to allow attachment of a variety of accessory, such as laser or telescopic sights, scopes, tactical lights, laser aiming modules, bipods, bayonets, rifle optics, and other accessories.

The foregrip 108 provides a mechanism held by the shooter's hand, including when operating the trigger 110. For example, a user can firmly position the butt 118 to his or her shoulder with one hand on the foregrip 108 and the other hand on the pistol grip 112 to be ready for pulling the trigger 110 with the trigger finger.

The trigger 110 is a lever pulled by the finger of the shooter (e.g., the index finger) to actuate the firing mechanism of the firearm 100. The trigger 110 is associated with the trigger mechanism 140 as described in FIG. 2.

The pistol grip 112 is a portion of the firearm 100 that is held by the hand and orients the hand in a forward, vertical orientation to operate the trigger 110.

The magazine 114 is an ammunition storage and feeding device within the firearm 100. In at least one embodiment, the magazine 114 is detachably installed to the firearm 100. For example, the magazine 114 is removably inserted into a magazine well of the receiver body 102 of the firearm 100.

The safety assembly 116 is a mechanism for preventing the accidental discharge of the firearm 100, helping to ensure safe handling. In at least one embodiment, the safety assembly 116 includes a safety lever that is switchable between two or more positions, such as a fire position and a safe position. The movement of the safety lever can be transferred rearward to the sear mechanism 120 with the aid of a trigger rod 144 (FIG. 2) disposed in the side of the receiver body 102.

The butt assembly 118 provides a butt for a shooter to firmly support the firearm 100 and easily aim it by holding the butt against his or her shoulder when firing. In at least one embodiment, the butt assembly 118 includes a butt cover that is hinged to the receiver body 102 so as to selectively open the receiver body 102. The butt cover can be secured to the receiver body 102 with a butt locking pin that is configured to be inserted to a first pin receiving hole on one side of the receiver body 102 and pass through corresponding butt locking holes until a second pin receiving hole on the other side of the receiver body 102. When the butt cover is open, several components of the firearm 100 can be inserted to the interior of the receiver body 102, such as the bolt assembly 142 and a recoil mechanism.

The sear mechanism 120 constitutes the trigger mechanism 140 (FIG. 2) with the trigger 110 and holds several components (such as a hammer, a striker, and a bolt) configured to discharge the firearm when a predetermined amount of pressure or force is applied to the trigger 110. As described herein, the sear mechanism 120 is designed to replace the OEM sear mechanism of the firearm 100, such as Tavor type rifles, and provide smooth, consistent pulling actions of the trigger 110, thereby improving accuracy in shooting.

The sear mechanism 120 is replaceably installed to the receiver body 102. As illustrated in FIG. 1, the sear mechanism 120 is configured to be inserted into the interior of the receiver body 102 and fixed to the receiver body 102 with the sear locking mechanism 122.

The sear locking mechanism 122 is configured to secure the sear mechanism 120 in place within the receiver body 102. In at least one embodiment, the sear locking mechanism 122 includes one or more sear mechanism locking pins 126 and one or more corresponding receiving holes 128 provided on both sides of the receiver body 102. The sear mechanism locking pins 126 are respectively inserted to one of the corresponding receiving holes 128 on one side of the receiver body 102, pass through mounting holes 238 or 240 (FIG. 5) of the sear mechanism 120, and engage the other of the corresponding receiving holes 128 on the other side of the receiver body 102.

The bolt carrier stop lever 124 is configured to open the receiver body 102 and make the interior of the receiver body 102 accessible for the sear mechanism 120 to be inserted therein. As depicted in FIG. 1, the bolt carrier stop lever 124 is pivotally connected to the receiver body 102 such that the lever 124 hinges on the receiver body 102.

Other embodiments of the firearm 100 have other configurations than the examples illustrated and described with reference to FIG. 1. For example, some of the components listed above are not included in some alternative embodiments.

Figure 2A:
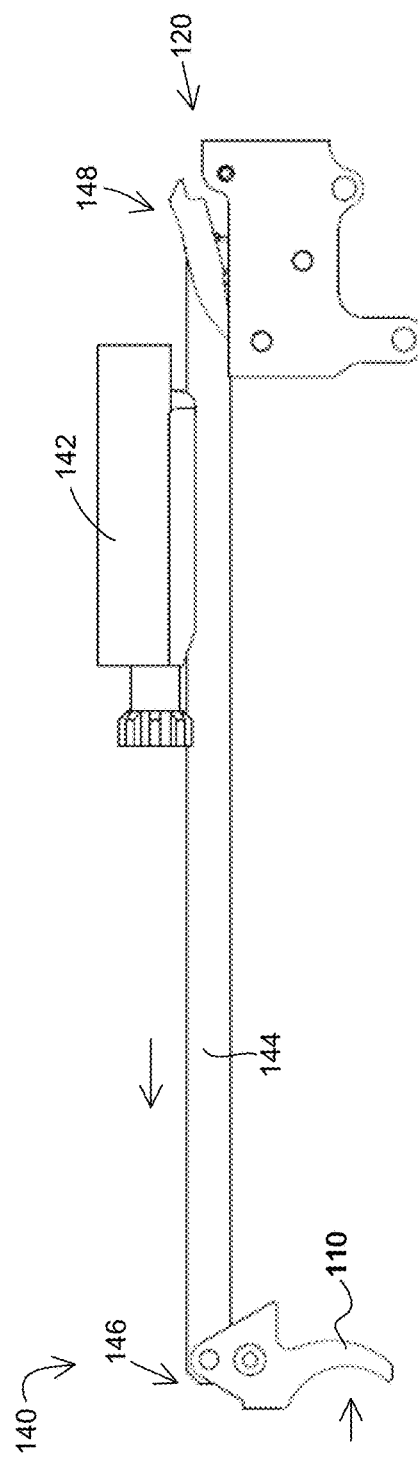
FIG. 2A is a schematic view of an example trigger mechanism illustrating an example sear mechanism in a cocked position.
Figure 2B:
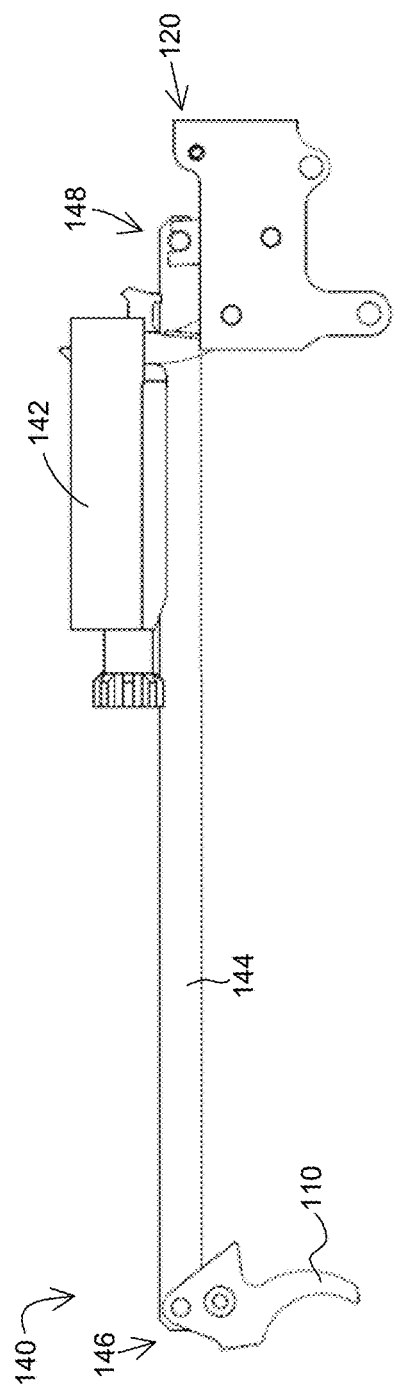
FIG. 2B is a schematic view of the trigger mechanism of FIG. 2A illustrating the sear mechanism in a released position.

FIG. 2 illustrates an example operation of the trigger mechanism 140 including the sear mechanism 120. In particular, FIG. 2A is a schematic view of the trigger mechanism 140 illustrating the sear mechanism 120 in a cocked position. FIG. 2B is a schematic view of the trigger mechanism 140 illustrating the sear mechanism 120 in a released position. The trigger mechanism 140 operates to actuate the bolt assembly 142. In addition to the trigger 110 and the sear mechanism 120, the trigger mechanism 140 includes a trigger rod 144.

The trigger mechanism 140 is configured to actuate the firing sequence of the firearm 100 by operating the bolt assembly 142 accommodated in the receiver body 102.

The bolt assembly 142 operates to block the rear of a chamber while a propellant burns and allow another cartridge or shell to be inserted into the chamber for the next firing. In at least one embodiment, the bolt assembly 142 is propelled in a rearward direction by recoil or expanding gas and returns in a forward direction by a recoil mechanism. When it moves rearward, an extractor pulls the spent casing from the chamber, and when it moves forward, it strips a cartridge from the magazine and pushes it into the chamber.

The trigger rod 144 is disposed in the receiver body 102 (shown in FIG. 1) to operatively connect the trigger 110 and the sear mechanism 120. The trigger rod 144 pivotally engages the trigger 110 at a first rod end 146, and is connected to one or more components (e.g., a trigger element 208, as discussed herein) of the sear mechanism 120 at a second rod end 148. In at least one embodiment, when the trigger 110 is pulled, the movement of the trigger 110 is transferred to the sear mechanism 120 through the trigger rod 144 such that the sear mechanism 120 is actuated from the cocked position (FIG. 2A) to the released position (FIG. 2B).

As described herein, the sear mechanism 120 includes a spring-biased hammer (e.g., a hammer element 204 (FIG. 5)) that is cocked in the cocked position (FIG. 2A) and then released by a sear component (e.g., a trigger element 208 (FIG. 5)) that is actuated by the trigger 110 through the trigger rod 144. The hammer strikes a firing pin carried by the bolt assembly 142, which in turn is thrust forward to contact and discharge a cartridge loaded in a chamber. A portion of the expanding combustion gases traveling down the barrel assembly 104 is used to drive the bolt assembly 142 rearward against a forward biasing force of a recoil spring for automatically ejecting the spent cartridge casing and automatically loading a new cartridge into the chamber from the magazine 114 when the bolt assembly 142 returns forward.

Figure 3:
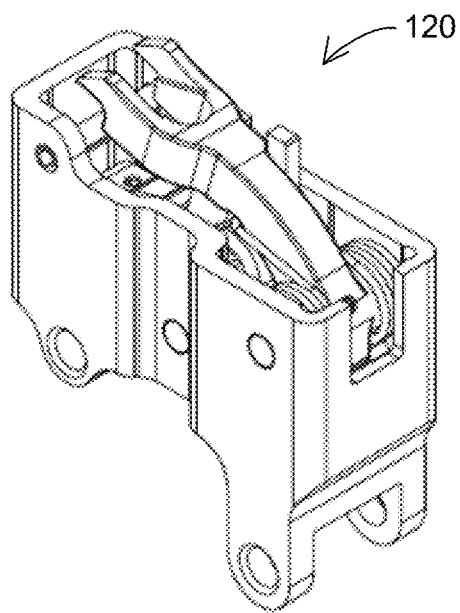
FIG. 3 is a perspective view of an example sear mechanism.

FIG. 3 is a perspective view of an example sear mechanism 120. In the depicted example, the sear mechanism 120 is in the cocked position. As described, the sear mechanism 120 is part of the trigger mechanism 140 (shown in FIG. 2) and actuated by the trigger 110 via the trigger rod 144. The sear mechanism 120 operates to discharge the firearm 100 when a predetermined amount of force is applied to pull the trigger 110.

The sear mechanism 120 is configured to increase the controllability for a shooter when the firearm 100 is used and improve the accuracy potential of the shooter, such as by minimizing mechanical distractions which can hinder accurate control of the firearm 100.

In at least one embodiment, the sear mechanism 120 is configured to provide a two-stage trigger mechanism that allows for a smooth first stage and a light, crisp second stage which causes the firearm 100 to be discharged once the resistance is overcome. The sear mechanism 120 according to the present disclosure can provide a two-stage trigger mechanism which has a consistent, reliable trigger pull.

As described herein, one or more of the pivotable elements (e.g., a trigger element) of the sear mechanism 120 include one or more contact surfaces on which one or more of the other pivotable or movable elements of the sear mechanism can selectively contact or slide. The sear mechanism 120 is operated by the interactions between the movable or pivotable elements of the sear mechanism. The interactions can include flat surface-to-surface contacts between the elements of the sear mechanism. However, such flat surface-to-surface contacts are extremely difficult to achieve as any deviation from perfect component size can cause two abutting surfaces to not sit flat to each other, thereby negatively affecting the sear or contact engagement and the trigger pull weight. Therefore, the accurate dimension and smoothness of the contact surfaces in the sear mechanism is important to make a trigger mechanism light, smooth, and reliable.

Figure 4:
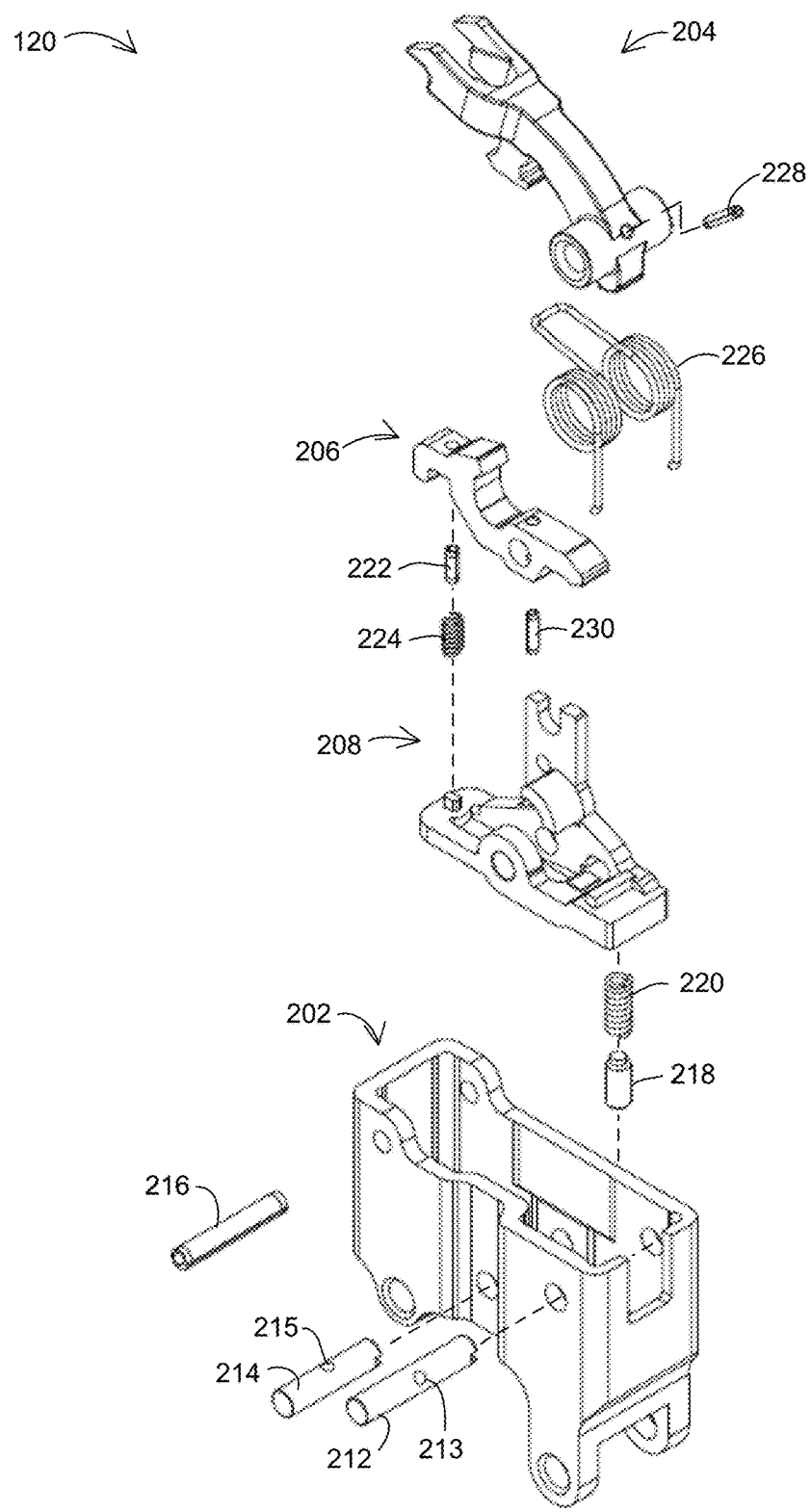
FIG. 4 is an exploded view of the sear mechanism of FIG. 3.

FIG. 4 is an exploded view of the sear mechanism 120 of FIG. 3. In at least one embodiment, the sear mechanism 120 includes a housing 202, a hammer element 204, a disconnector element 206, and a trigger element 208.

The housing 202 provides a space for operatively mounting the hammer element 204, the disconnector element 206, and the trigger element 208. The housing 202 is configured to be detachably mounted into an opening provided in the receiver body 102 of the firearm 100. An example of the housing 202 is described and illustrated in more detail with reference to FIG. 5.

The hammer element 204 is disposed in the housing 202 and configured to pivot between the cocked position and the released position such that the hammer element 204 strikes a firing pin of the bolt assembly 142 as it moves from the cocked position to the released position. An example of the hammer element 204 is described and illustrated in more detail with reference to FIG. 6.

The disconnector element 206 is disposed in the housing 202 and pivotally connected to at least one of the housing 202 and the hammer element 204. The disconnector element 206 interacts with the hammer element 204 and the trigger element 208 to operate the hammer element 204 between the cocked position and the released position and provide the two-stage trigger movement. An example of the disconnector element 206 is described and illustrated in more detail with reference to FIG. 7.

The trigger element 208 is pivotally connected to the housing 202 and connected to the trigger 110 through the trigger rod 144. The trigger element 208 is configured to interact with the hammer element 204 and the disconnector element 206 to operate the hammer element 204 between the cocked position and the released position. The trigger element 208 is configured to accurately position the disconnector element 206 in relation to the hammer element 204 and provide the two-stage trigger movement. An example of the trigger element 208 is described and illustrated in more detail with reference to FIG. 8.

With continued reference to FIG. 4, the sear mechanism 120 includes an operating mechanism for operatively connecting the hammer element 204, the disconnector element 206, and the trigger element 208 to the housing 202. In at least one embodiment, the operating mechanism includes a first pivot support 212, a second pivot support 214, a stopper pin 216, a trigger biasing support 218, a trigger biasing member 220, a disconnector biasing support 222, a disconnector biasing member 224, a hammer biasing member 226, a first pivot support pin 228, and a second pivot support pin 230.

The first pivot support 212 is configured to pivotally support the hammer element 204 in the housing 202. In at least one embodiment, the first pivot support 212 is configured as a pivot pin that is inserted into, and supported by, the housing 202 so as to be arranged across the opposing side walls of the housing 202. As described herein, the first pivot support 212 engages the hammer element 204 and is rotatably supported by the opposing side walls of the housing 202. In other embodiments, the second pivot support 214 is fixedly supported by the housing 202 and provides a surface on which the hammer element 204 bears and pivots.

The second pivot support 214 is configured to pivotally support the trigger element 208 and the disconnector element 206 in the housing 202. In at least one embodiment, the second pivot support 214 is configured as a pivot pin that is inserted into, and supported by, the housing 202 so as to be arranged across opposing side walls of the housing 202. As described herein, the second pivot support 214 engages the trigger element 208 and the disconnector element 206 and is rotatably supported by the opposing side walls of the housing 202. In other embodiments, the second pivot support 214 is fixedly supported by the housing 202 and provides a surface on which the trigger element 208 and the disconnector element 206 bear and pivot.

The stopper pin 216 provides a stop that terminates downward movement of the hammer element 204 during the recoil process.

The trigger biasing support 218 is configured to provide a support or guide for the trigger biasing member 220. The trigger biasing support 218 can be fixed on the inner base surface of the housing 202 and extend therefrom such that the trigger biasing member 220 is placed to surround at least a portion of the trigger biasing support 218. The trigger biasing support 218 holds the trigger biasing member 220 in place as the trigger biasing member 220 acts against the trigger element 208. In other embodiments, the trigger biasing support 218 is integrally formed with either the housing 202 or the trigger element 208.

The trigger biasing member 220 is configured to bias the trigger element 208 relative to the housing 202. In at least one embodiment, the trigger biasing member 220 is configured as a coil compression spring. The trigger biasing member 220 is arranged between the trigger element 208 and the inner base surface of the housing 202.

The disconnector biasing support 222 is configured to support the disconnector biasing member 224. The disconnector biasing support 222 can be fixed on the disconnector element 206 and extend therefrom such that the disconnector biasing member 224 is placed to surround the disconnector biasing support 222. The disconnector biasing support 222 holds the disconnector biasing member 224 in place as the disconnector biasing member 224 operates between the disconnector element 206 and the trigger element 208. In other embodiments, the disconnector biasing support 222 is integrally formed with the disconnector element 206.

The disconnector biasing member 224 is configured to bias the disconnector element 206 relative to the trigger element 208. In at least one embodiment, the disconnector biasing member 224 is configured as a coil compression spring. The disconnector biasing member 224 can be arranged between the disconnector element 206 and the trigger element 208.

The hammer biasing member 226 is configured to bias the hammer element 204 to the released position relative to the housing 202. In at least one embodiment, the hammer biasing member 226 is configured as a torsion spring that works by torsion or twisting. When the spring is twisted, it exerts a torque in the opposite directions, proportional to the amount it is twisted. The hammer biasing member 226 can have a coil portion, a first leg, and a second leg opposite to the first leg. The first leg of the hammer biasing member 226 can engage a portion of the hammer element 204 while the second leg of the hammer biasing member 226 abuts a portion of the housing 202. The hammer biasing member 226 biases the hammer element 204 toward the released position. When the hammer element 204 is in the cocked position, the hammer biasing member 226 is bent such that the first and second legs come closer against the biasing force thereof.

The first pivot support pin 228 is used to fix the hammer element 204 with the first pivot support 212. In at least one embodiment, the first pivot support pin 228 is inserted into a fixing pin insert hole 260 (FIG. 6) of the hammer element 204 and subsequently into a fixing pin receptacle 213 of the first pivot support 212. As such, the hammer element 204 is fixedly attached to the first pivot support 212 such that the hammer element 204 pivots as the first pivot support 212 rotates relative to the housing 202.

The second pivot support pin 230 is used to fix the disconnector element 206 with the second pivot support 214 and enable the trigger element 208 to pivot on the second pivot support 214. In at least one embodiment, the second pivot support pin 230 is inserted into a fixing pin insert hole 280 (FIG. 7) of the disconnector element 206 and subsequently into a fixing pin receptacle 215 of the second pivot support 214. As such, the disconnector element 206 is fixedly attached to the second pivot support 214 such that the disconnector element 206 pivots as the second pivot support 214 rotates relative to the housing 202. As described herein, the disconnector element 206 is rotatably engaged with the trigger element 208 through the second pivot support 214. For doing so, first and second pivot support insert holes 300 and 302 (FIG. 8) of the trigger element 208 are aligned with a pivot support insert hole 278 (FIG. 7) of the disconnector element 206, and the second pivot support 214 is inserted into the first and second pivot support insert holes 300 and 302 of the trigger element 208 and the pivot support insert hole 278 of the disconnector element 206 to pivotally hold the trigger element 208 relative to the housing 202 and the disconnector element 206.

Figure 5:
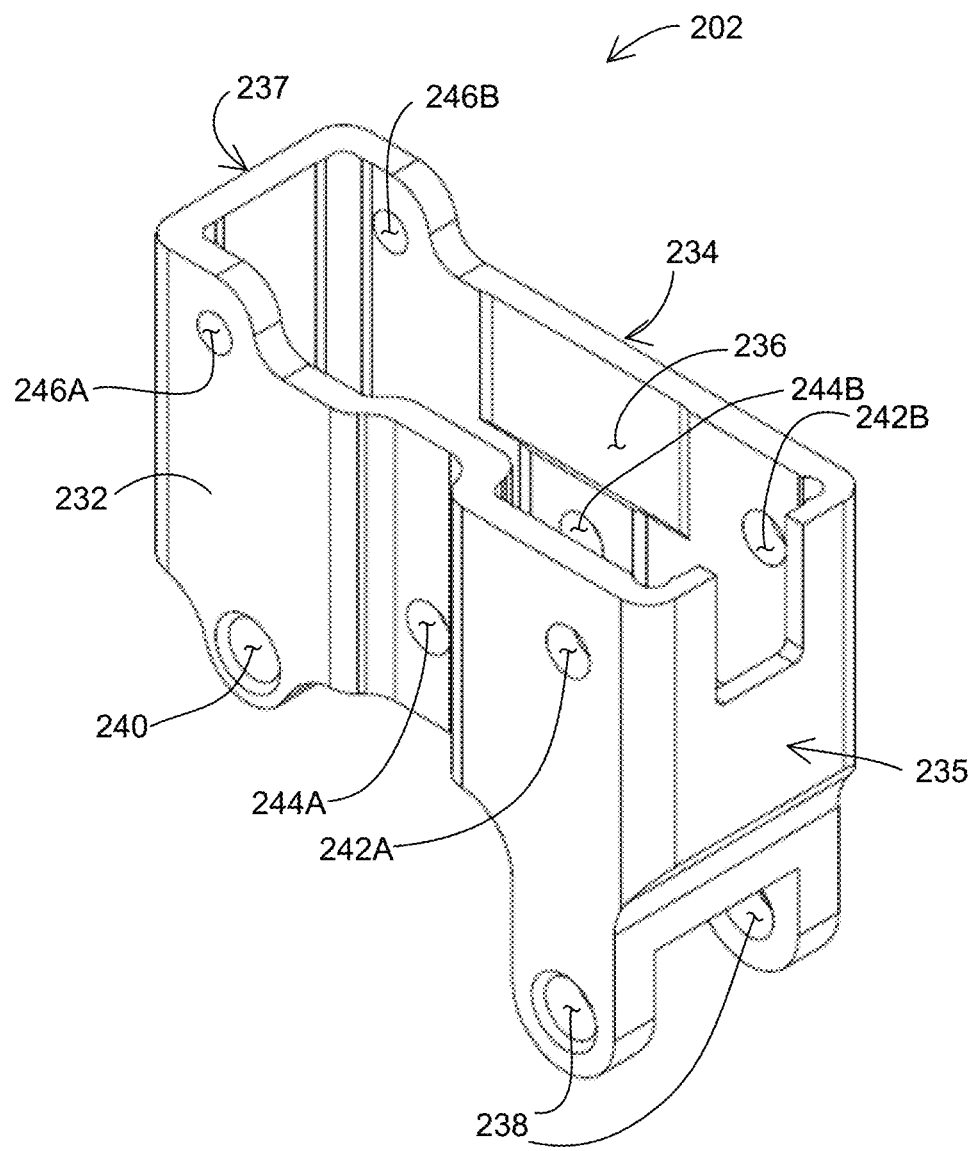
FIG. 5 is a schematic view of an example housing of the sear mechanism of FIG. 4.

FIG. 5 is a schematic view of the housing 202 of FIG. 4. In at least one embodiment, the housing 202 includes first and second side walls 232 and 234, a bore 236, one or more first mounting holes 238, one or more second mounting holes 240, support openings 242A and 242B for supporting the hammer element 204, support openings 244A and 244B for supporting the disconnector element 206 and the trigger element 208, and stopper support openings 246A and 246B.

The first and second side walls 232 and 234 extend between a first housing end 235 and a second housing end 237. The first and second side walls 232 and 234 constitute at least part of the housing 202 and define the bore 236.

The bore 236 is defined at least partially by the first and second side walls 232 and 234 and configured to provide a space for receiving the components of the sear mechanism 120, such as the hammer element 204, the disconnector element 206, the trigger element 208, and other associated elements.

The first mounting holes 238 are provided to the housing 202 to couple the sear mechanism 120 to the firearm 100 when the sear mechanism 120 is inserted into the firearm 100, as shown in FIG. 1. In the depicted embodiment, two first mounting holes 238 are provided with one extending from the first side wall 232 and the other extending from the second side wall 234. When the sear mechanism 120 is inserted into the receiver body 102 of the firearm 100 and the first mounting holes 238 are aligned with the corresponding first receiving holes 128A of the receiver body 102, a first locking pin 126A is inserted into one of the first receiving holes 128A, the first mounting holes 238, and the other of the first receiving holes 128A to couple the sear mechanism 120 to the receiver body 102.

The second mounting holes 240 are similarly provided to the housing 202 couple the sear mechanism to the firearm 100 in cooperation with the first mounting holes 238. In the depicted embodiment, two second mounting holes 240 are provided with one extending from the first side wall 232 and the other extending from the second side wall 234. When the sear mechanism 120 is inserted into the receiver body 102 of the firearm 100 and the second mounting holes 240 are aligned with the corresponding second receiving holes 128B of the receiver body 102, a second locking pin 126B is inserted into one of the second receiving holes 128B, the second mounting holes 240, and the other of the second receiving holes 128B to couple the sear mechanism 120 to the receiver body 102.

The support openings 242A and 242B are used to rotatably support the first pivot support 212. In the depicted embodiment, a first support opening 242A is formed on the first side wall 232, and a second support opening 242B is correspondingly formed on the second side wall 234. The first pivot support 212 is first inserted to one of the support openings 242A and 242B and then to the other of the support openings 242A and 242B after passing through the hammer element 204. The support openings 242A and 242B rotatably support both ends of the first pivot support 212, respectively.

The support openings 244A and 244B are used to rotatably support the second pivot support 214. In the depicted embodiment, a first support opening 244A is formed on the first side wall 232, and a second support opening 244B is correspondingly formed on the second side wall 234. The second pivot support 214 is first inserted to one of the support openings 244A and 244B, and then to the other of the support openings 244A and 244B after passing through the trigger element 208 and the disconnector element 206. The support openings 244A and 244B rotatably support both ends of the second pivot support 214, respectively.

The stopper support openings 246A and 246B support the stopper pin 216 therein, as shown in FIG. 4.

Figure 6:
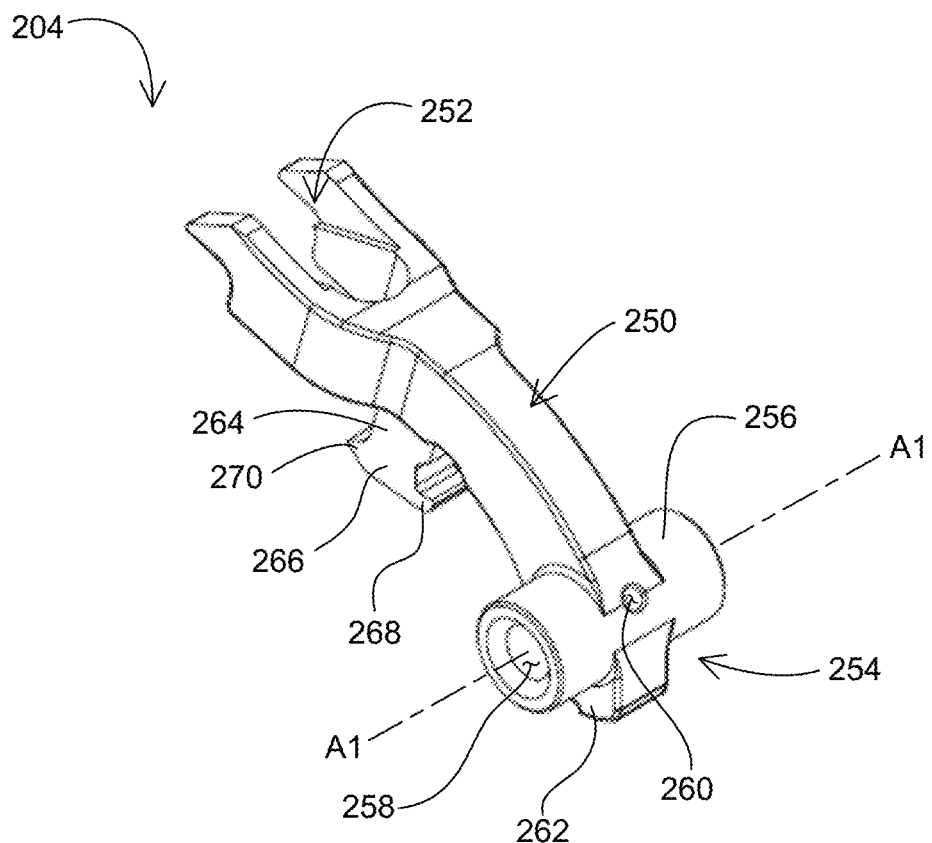
FIG. 6 is a schematic view of an example hammer element of the sear mechanism of FIG. 4.

FIG. 6 is a schematic view of the hammer element 204 of FIG. 4. In at least one embodiment, the hammer element 204 includes a hammer body 250, a hammer head 252, and a hammer tail 254 including a biasing member support portion 256, a pivot support insert hole 258, a fixing pin insert hole 260, and a notch portion 262. The hammer element 204 further includes a hammer leg 264 and a hammer sear 266 with a first sear edge 268 and a second sear edge 270.

The hammer body 250 extends between the hammer head 252 and the hammer tail 254 and is configured to swing on the hammer tail 254 between the cocked position and the released position. The hammer body 250 is used to hold one end of the hammer biasing member 226, such as a torsion spring while the other end of the hammer biasing member 226 abuts the housing 202.

The hammer head 252 is configured to selectively engage the bolt assembly 142 (e.g., the firing pin thereof) when the hammer element 204 is in the released position. The hammer head 252 can have different shapes to engage the corresponding portion of the bolt assembly 142.

The hammer tail 254 is configured to engage the first pivot support 212 and operates as a pivot axis A1 of the hammer element 204.

The biasing member support portion 256 of the hammer tail 254 is configured to engage the coil portion of the hammer biasing member 226. In the depicted embodiment, the biasing member support portion 256 extends perpendicularly to a length of the hammer body 250 (along the pivot axis of the hammer element 204) and is cylindrically shaped to provide a surface on which the coil portion of the hammer biasing member 226 bears.

The pivot support insert hole 258 is defined within the biasing member support portion 256 and configured to receive the first pivot support 212 therein. The first pivot support 212 passes through the pivot support insert hole 258 while both ends of the first pivot support 212 are supported by the support openings 242A and 242B.

The fixing pin insert hole 260 is configured to receive the first pivot support pin 228, which is used to fix the hammer element 204 with the first pivot support 212. In the depicted embodiment, the fixing pin insert hole 260 is formed to be perpendicular to the pivot axis A1 (i.e., a length of the pivot support insert hole 258) and in communication with the pivot support insert hole 258. The first pivot support pin 228 is configured to be inserted into a fixing pin receptacle 213 of the first pivot support 212 through the fixing pin insert hole 260. When the first pivot support 212 is inserted to the support openings 242A and 242B, the fixing pin receptacle 213 is arranged to be aligned with the fixing pin insert hole 260 so that the first pivot support pin 228 is inserted into the fixing pin insert hole 260 and the fixing pin receptacle 213. By the first pivot support pin 228, the hammer element 204 is fixed to the first pivot support 212 and therefore can rotate together with the first pivot support 212.

The notch portion 262 is configured to interact with a hammer pad 312 (FIG. 8) of the trigger element 208 and provides a secondary safety function. As discussed herein, the notch portion 262 and the hammer pad 312 of the trigger element 208 each have opposing surfaces which will passively come into contact with each other without the trigger 110 being pulled rearward. For example, the hammer pad 312 engages the notch portion 262 when the sear mechanism 120 is in the cocked position. In the event that the trigger sear 306 fails to engage the hammer sear 266 in the cocked position, the interaction of the hammer pad 312 with the notch portion 262 operates as the secondary safety that can prevent the hammer element 204 from being activated by the hammer biasing member 226.

The hammer leg 264 extends from the hammer body 250 and toward the disconnector element 206 and the trigger element 208. The hammer leg 264 is configured to connect the hammer body 250 and the hammer sear 266.

The hammer sear 266 is configured to interact with, and come into contact with, at least one of the disconnector element 206 and the trigger element 208 as the hammer element 204 moves from the released position to the cocked position and/or when the hammer element 204 is in the cocked position. The hammer sear 266 can cooperate with a portion of the disconnector element 206 to position the disconnector element 206 relative to the trigger element 208 and/or the housing 202, and also cooperate with a portion of the trigger element 208 to hold the hammer element 204 in the cocked position and release the hammer element 204 from the cocked position.

The first sear edge 268 of the hammer sear 266 is configured to selectively interlock with a trigger sear 306 (FIG. 8) of the trigger element 208 in the cocked position. In at least one embodiment, the first sear edge 268 is formed at an edge of the hammer sear 266 adjacent the trigger sear 306 of the trigger element 208. The first sear edge 268 operates as a hook or flange for selectively engaging the hammer sear 266 with the trigger sear 306 of the trigger element 208.

The second sear edge 270 of the hammer sear 266 is configured to selectively interact with a rearward face (i.e., a hammer sear contact face 282 (FIG. 7) of the disconnector element 206 when the sear mechanism 120 changes between the cocked position and the released position. In at least one embodiment, the second sear edge 270 is formed at an edge of the hammer sear 266 opposite to the first sear edge 268. The second sear edge 270 operates as a stopping edge or face for contacting the rearward face of the disconnector element 206.

Figure 7:
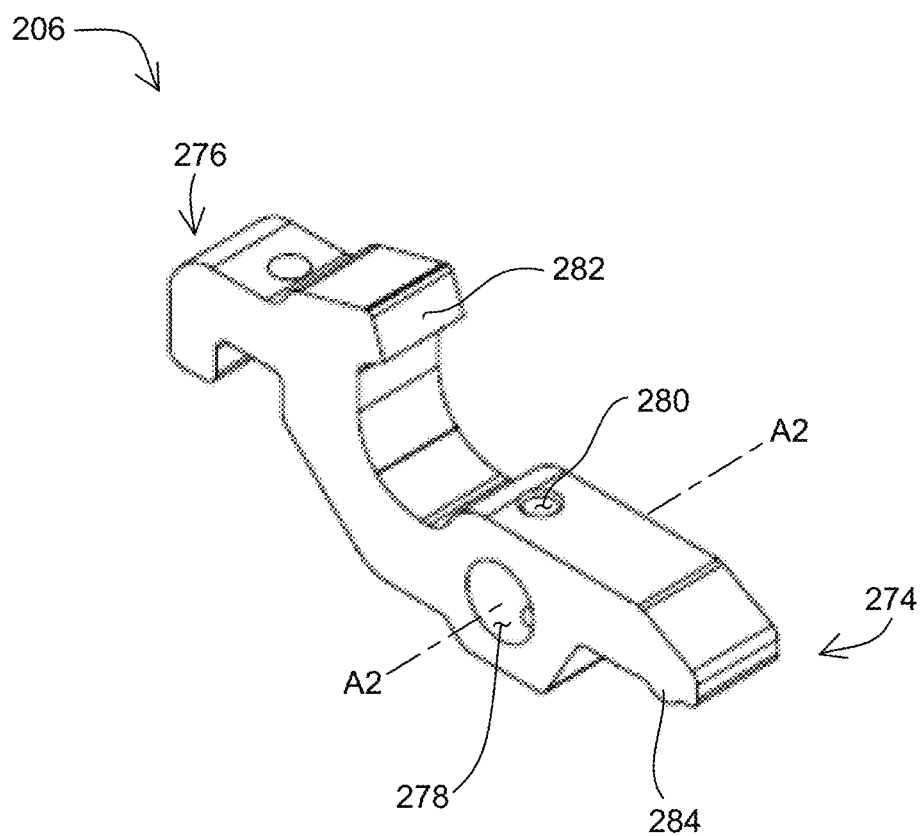
FIG. 7 is a perspective view of an example disconnector element of the sear mechanism of FIG. 4.

FIG. 7 is a perspective view of the disconnector element 206 of FIG. 4. The disconnector element 206 extends between a first disconnector end 274 and a second disconnector end 276. In at least one embodiment, the disconnector element 206 includes a pivot support insert hole 278, a fixing pin insert hole 280, a hammer sear contact face 282, and a trigger element contact portion 284.

The pivot support insert hole 278 is formed in the body of the disconnector element 206 between the first and second disconnector ends 274 and 276. The pivot support insert hole 278 is configured to receive the second pivot support 214 therein. The second pivot support 214 passes through the pivot support insert hole 278 while both ends of the second pivot support 214 are supported by the support openings 244A and 244B. As described herein, the disconnector element 206 is at least partially placed in a receptacle 298 (FIG. 8) of the trigger element 208 such that the pivot support insert hole 278 of the disconnector element 206 is aligned with first and second pivot support insert holes 300 and 302 of the trigger element 208. Thus, the second pivot support 214 is inserted to the first pivot support insert hole 300 of the trigger element 208, the pivot support insert hole 278 of the disconnector element 206, the second pivot support insert hole 302 of the trigger element 208 and is rotatably supported by the support openings 244A and 244B of the housing 202.

The fixing pin insert hole 280 is configured to receive the second pivot support pin 230, which is used to fix the disconnector element 206 with the second pivot support 214. In the depicted embodiment, the fixing pin insert hole 280 is formed to be perpendicular to a pivot axis A2 (i.e., the length of the pivot support insert hole 278) and in communication with the pivot support insert hole 278. The second pivot support pin 230 is configured to be inserted into a fixing pin receptacle 215 of the second pivot support 214 through the fixing pin insert hole 280.

The hammer sear contact face 282 is configured to selectively contact the second sear edge 270 of the hammer sear 266. As described herein, the hammer sear contact face 282 can contact the second sear edge 270 of the hammer sear 266 when the hammer element 204 moves between the cocked position and the released position. In at least one embodiment, the hammer sear contact face 282 is arranged at or proximate to the second disconnector end 276.

The trigger element contact portion 284 is arranged at or proximate to the first disconnector end 274 and configured to selectively contact the hammer tail 254. As described herein, in at least one embodiment, the trigger element contact portion 284 is configured to selectively engage a disconnector pad 310 (FIG. 8) of the trigger element 208.

Figure 8:
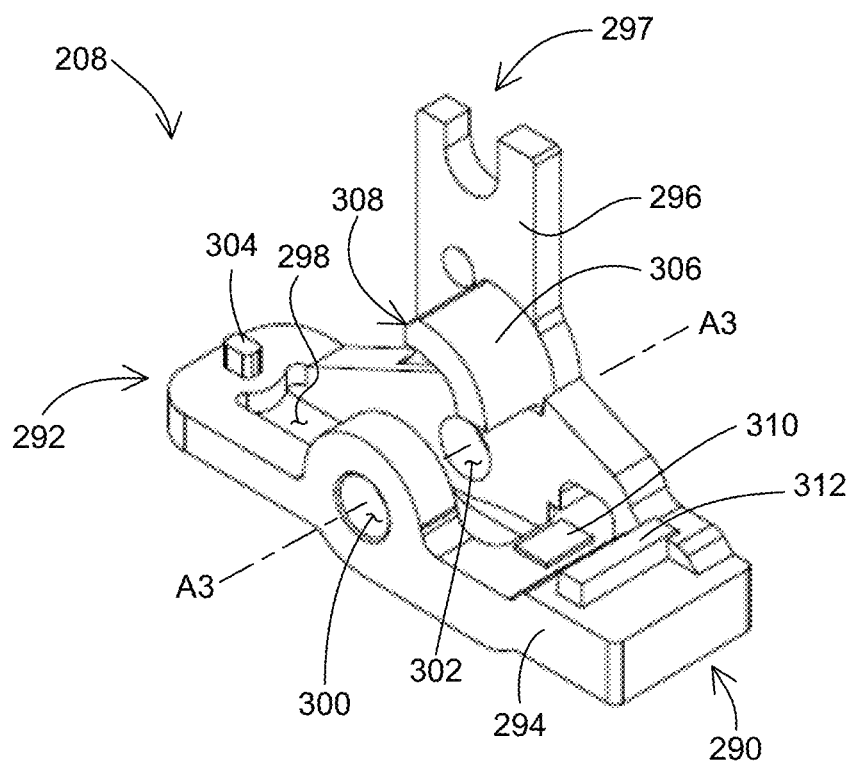
FIG. 8 is a perspective view of an example trigger element of the sear mechanism of FIG. 4.

FIG. 8 is a perspective view of the trigger element 208 of FIG. 4. The trigger element 208 includes and generally extends between a first trigger end 290 and a second trigger end 292. In at least one embodiment, the trigger element 208 includes a base 294, a side wall 296, a rod engaging portion 297, a disconnector receptacle 298, a first pivot support insert hole 300, a second pivot support insert hole 302, a biasing member support 304, a trigger sear 306 having a sear contact surface 308, a disconnector pad 310, and a hammer pad 312.

The base 294 extends between the first and second trigger ends 290 and 292 and is configured to be rotatably connected to the housing 202 and rotatably engage the disconnector element 206, as described herein.

The side wall 296 is arranged between the first and second trigger ends 290 and 292 and extends from the base 294. In at least one embodiment, the side wall 296 extends vertically from the base 294.

The rod engaging portion 297 is configured to operatively engage an end of the trigger rod 144 opposite to the other end of the trigger rod 144, which engages the trigger 110.

The disconnector receptacle 298 is formed in the base 294 and configured to at least partially receive the disconnector element 206. The disconnector element 206 is pivotally received into the receptacle 298 via the second pivot support 214.

The first and second pivot support insert holes 300 and 302 are formed on the opposing sides of the trigger element 208 (e.g., the base 294), respectively, between the first and second trigger ends 290 and 292. The first and second pivot support insert holes 300 and 302 are configured to receive the second pivot support 214 therein. The first and second pivot support insert holes 300 and 302 are aligned to the pivot support insert hole 278 of the disconnector element 206 when the disconnector element 206 is inserted into the disconnector receptacle 298. Then, the second pivot support 214 is inserted to the first pivot support insert hole 300, the pivot support insert hole 278 of the disconnector element 206, and the second pivot support insert hole 302 in order or vice versa. As described above, the second pivot support 214 is fixedly connected to the disconnector element 206 by the second pivot support pin 230, and the second pivot support 214 is freely rotatable relative to the trigger element 208 and the housing 202. Thus, the disconnector element 206 and the trigger element 208 are supported by the housing 202 via the second pivot support 214 and independently rotatable relative to the housing 202.

The biasing member support 304 is configured to hold one end of the disconnector biasing member 224 while the other end of the disconnector biasing member 224 is supported by the disconnector biasing support 222 mounted to the disconnector element 206. The biasing member support 304 can be arranged at or adjacent the second trigger end 292 of the trigger element 208.

The trigger sear 306 is configured to selectively engage or contact the hammer sear 266 as the hammer element 204 moves between the cocked position and the released position. In at least one embodiment, the trigger sear 306 is formed on the side wall 296 such that the sear contact surface 308 of the trigger sear 306 is positioned above the base 294. As illustrated, in some embodiments, the trigger sear 306 is cantilevered from the side wall 296. An example interaction of the trigger sear 306 with other components of the sear mechanism 120 is illustrated and described in more detail with reference to FIG. 10.

The sear contact surface 308 of the trigger sear 306 is a surface on which the hammer sear 266 of the hammer element 204 slides as the hammer element 204 moves between the cocked position and the released position. In at least one embodiment, the first sear edge 268 of the hammer sear 266 is configured to selectively contact the sear contact surface 308 of the trigger sear 306. An example structure and/or manufacturing process of the sear contact surface 308 is illustrated and described in more detail with reference to FIGS. 14-18.

The disconnector pad 310 provides a surface to which the trigger element contact portion 284 of the disconnector element 206 selectively contacts, depending on the position of the disconnector element 206 relative to the trigger element 208. The disconnector pad 310 is configured to position the disconnector element 206 relative to the trigger element 208. In at least one embodiment, the disconnector pad 310 is arranged on the base 294 at or adjacent the first trigger end 290. An example structure and manufacturing process of the disconnector pad 310 is illustrated and described in more detail with reference to FIGS. 14-16 and 19-20.

The hammer pad 312 provides a surface to which the hammer tail 254 (e.g., the notch 262 thereof) selectively contacts, depending on the position of the hammer element 204 relative to the trigger element 208. In at least one embodiment, the hammer pad 312 of the trigger element 208 and the notch 262 of the hammer element 204 cooperate to provide a secondary safety mechanism, which operates to prevent accidental discharging of the firearm 100 in the event that the firearm 100 is loaded and the hammer element 204 is in the cocked position. The interaction of the hammer pad 312 and the notch 262 can catch the hammer element 204 and prevent the firearm 100 from discharging even if the hammer sear 266 and the trigger sear 306 release the hammer element 204 from the cocked position without a trigger pull. An example structure and/or manufacturing process of the hammer pad 312 is illustrated and described in more detail with reference to FIGS. 14-16 and 21-22.

Figure 9:
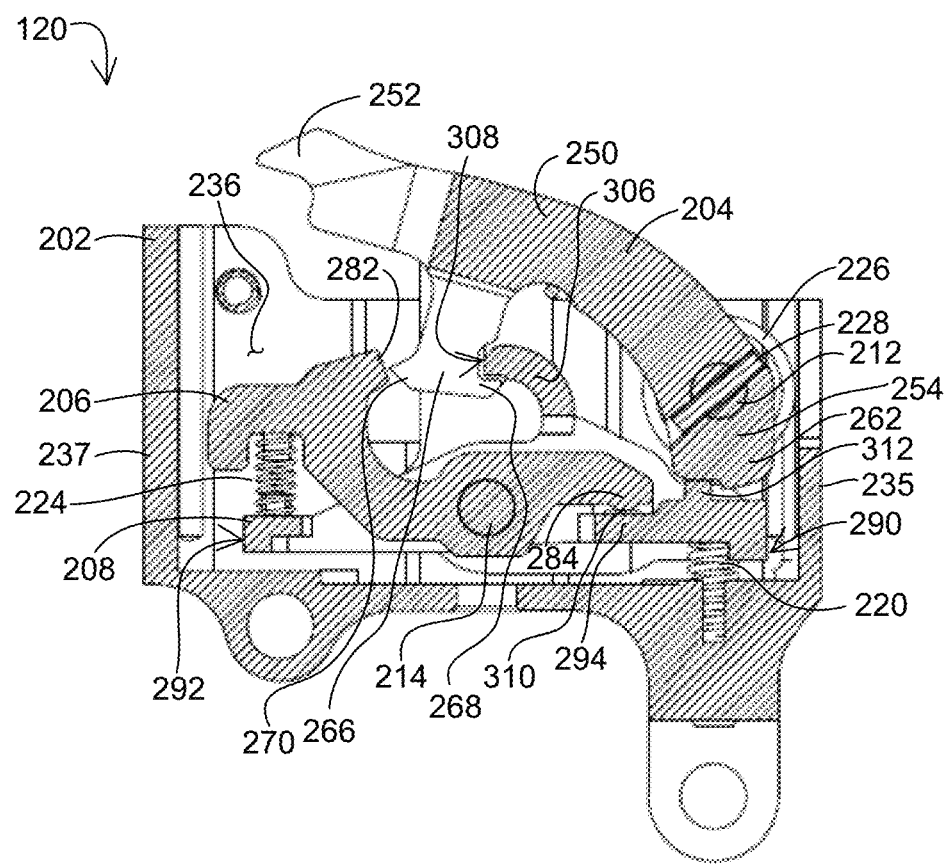
FIG. 9 is a side cross-sectional view of the sear mechanism illustrating the assembly of the sear mechanism.

FIG. 9 is a side cross-sectional view of the sear mechanism 120 illustrating the assembly of the sear mechanism 120. In FIG. 9, the sear mechanism 120 is in the cocked position.

As depicted, the trigger element 208 is rotatably supported by the second pivot support 214 within the bore 236 of the housing 202. The trigger element 208 is positioned in the housing 202 such that the first trigger end 290 and the second trigger end 292 are arranged adjacent the first housing end 235 and the second housing end 237, respectively. Therefore, the disconnector pad 310 and the hammer pad 312 are arranged adjacent the first housing end 235. The trigger element 208 engages the trigger biasing member 220 against the housing 202 adjacent the first housing end 235. The trigger biasing member 220 operates to bias the trigger element 208 counterclockwise around the second pivot support 214 from the view of FIG. 9.

The disconnector element 206 is rotatably supported by the second pivot support 214 within the bore 236 of the housing 202. The disconnector element 206 is positioned in the housing 202 such that the first disconnector end 274 and the second disconnector end 276 are arranged adjacent the first housing end 235 and the second housing end 237, respectively. As such, the trigger element contact portion 284 is arranged adjacent the first housing end 235, and the hammer sear contact face 282 is arranged adjacent the second housing end 237.

The disconnector biasing member 224 is disposed between the trigger element 208 and the disconnector element 206 adjacent the second housing end 237. For example, the disconnector biasing member 224 is supported between the second trigger end 292 of the trigger element 208 and the second disconnector end 276 of the disconnector element 206. The disconnector biasing member 224 operates to bias the disconnector element 206 relative to the trigger element 208 and clockwise around the second pivot support 214 from the view of FIG. 9. As a result, the disconnector biasing member 224 causes the trigger element contact portion 284 of the disconnector element 206 to contact the disconnector pad 310 of the trigger element 208.

The hammer element 204 is at least partially inserted into the bore 236 of the housing 202 and rotatably supported by the first pivot support 212. The hammer element 204 is positioned in the housing 202 such that the hammer tail 254 is arranged adjacent the first housing end 235 and the hammer head 252 is arranged adjacent the second housing end 237 in the cocked position. The hammer element 204 remains biased clockwise by the hammer biasing member 226 (i.e., toward the released position).

The notch portion 262 of the hammer tail 254 can be selectively engaged and in contact with the hammer pad 312 of the trigger element 208. As described above, the interaction of the notch portion 262 and the hammer pad 312 operates as a secondary safety mechanism while a first safety mechanism, which is provided by the interaction between the hammer sear 266 and the trigger sear 306, fails to work as described herein in the cocked position.

As illustrated in FIG. 9, the hammer sear 266 is arranged generally between the trigger sear 306 of the trigger element 208 and the hammer sear contact surface 282 of the disconnector element 206. As described herein, depending on the relative positions of the hammer element 204, the disconnector element 206, and the trigger element 208, the hammer sear 266 can contact the hammer sear contact surface 282, and/or engage the trigger sear 306. An example interaction of the hammer element 204, the disconnector element 206, and the trigger element 208 is illustrated and described in more detail with reference to FIGS. 10 and 11.

Figure 10A:
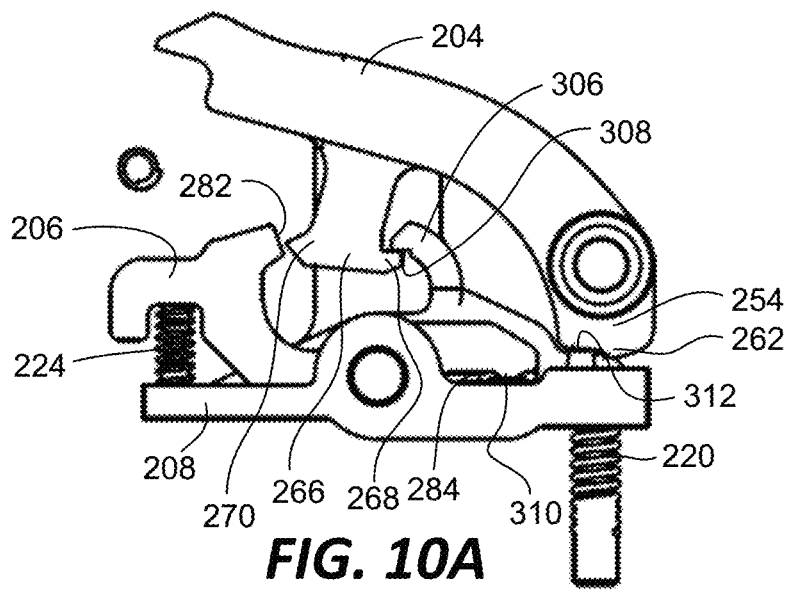
FIG. 10A illustrates that the sear mechanism is in a cocked position.
Figure 10B:
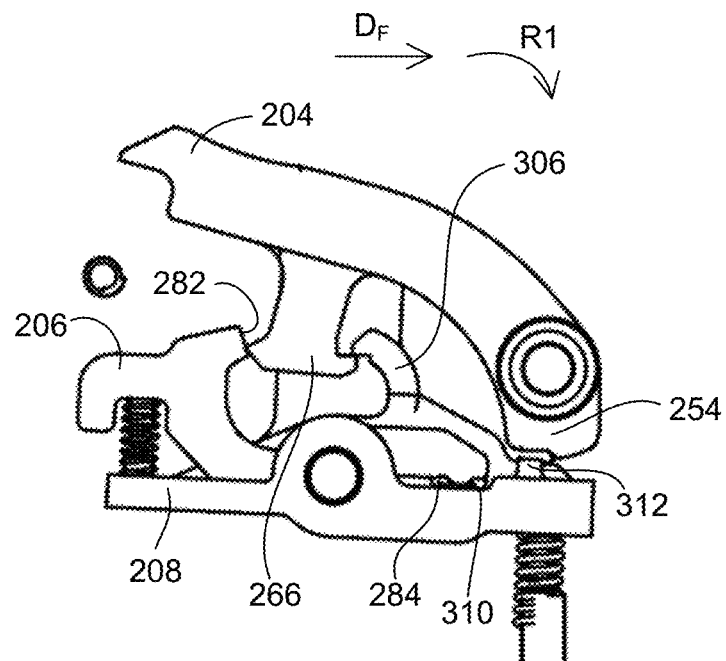
FIG. 10B illustrates that the sear mechanism is in an intermediate position.
Figure 10C:
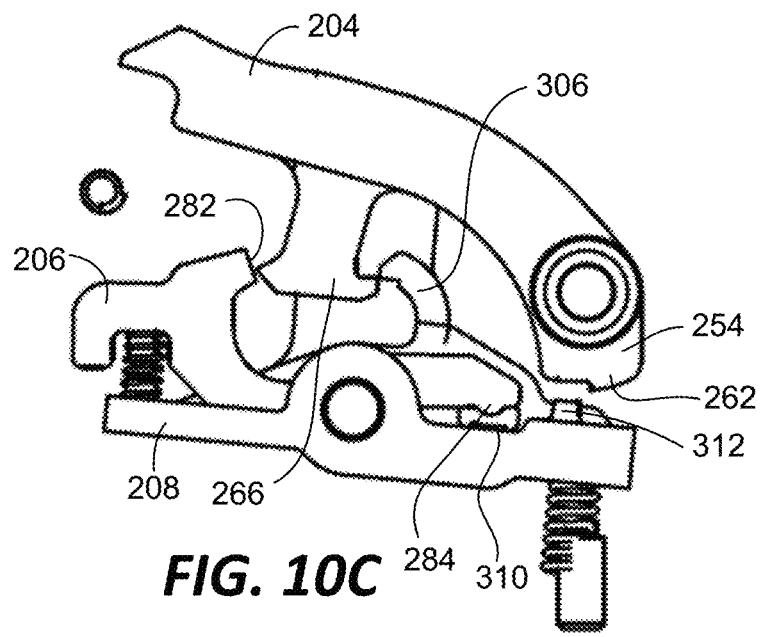
FIG. 10C illustrates that the sear mechanism is at a release point.
Figure 10D:
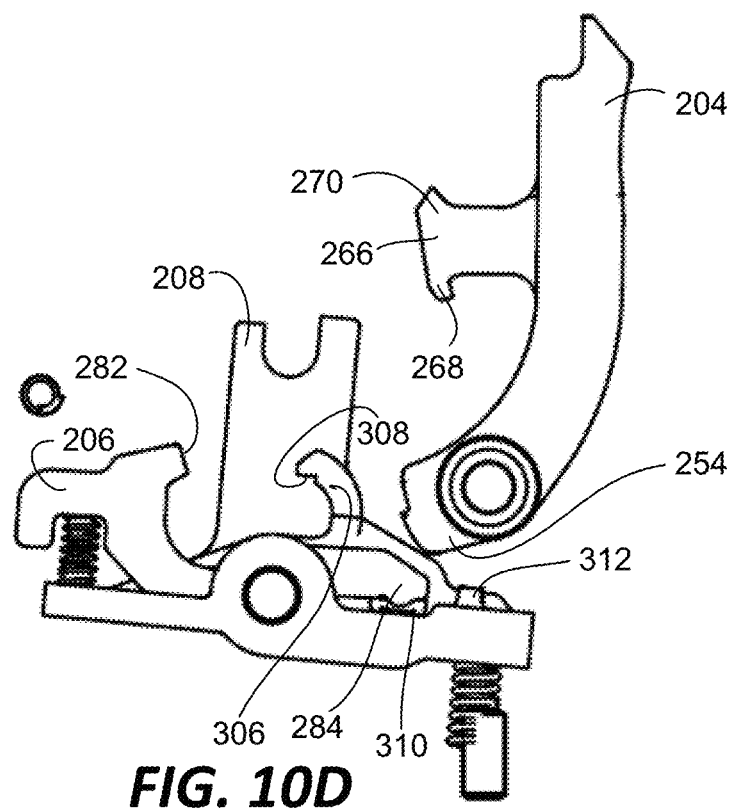
FIG. 10D illustrates that the sear mechanism is in a released position.

FIGS. 10A-10D are schematic views to illustrate a firing operation of the sear mechanism 120. In particular, FIGS. 10A and 10B illustrate a first stage trigger operation, and FIGS. 10C and 10D illustrate a second stage trigger operation.

FIG. 10A depicts that the sear mechanism 120 is completely in the cocked position. In the cocked position, the hammer sear 266 is fully engaged with the trigger sear 306. For example, the first sear edge 268 of the hammer sear 266 is hooked to the sear contact surface 308 of the trigger sear 306. The hammer sear 266 does not contact the hammer sear contact surface 282 of the disconnector element 206 in the cocked position. The trigger element contact portion 284 of the disconnector element 206 remains contact with the disconnector pad 310 of the trigger element 208 due to the biasing force of the disconnector biasing member 224. The hammer tail 254 is maintained to contact the hammer pad 312 of the trigger element 208 due to the biasing force of the hammer biasing member 226.

FIG. 10B illustrates that the sear mechanism 120 is in an intermediate position. As the trigger 110 is pulled, the trigger rod 144 is pulled in a forward direction D$_F$ (i.e., toward the trigger 110 or away from the sear mechanism 120), and therefore the trigger element 208 rotates in a first rotational direction R1 around the pivot axis A2/A3 (clockwise in FIG. 10B). The disconnector element 206 also rotates in the first rotational direction R1 along with the trigger element 208 by the force of the disconnector biasing member 224. From the cocked position to the intermediate position, the disconnector element 206 and the trigger element 208 rotates together by the disconnector biasing member 224. Accordingly, the sear mechanism 120 moves from the cocked position to the intermediate position.

In the intermediate position, the hammer sear 266 becomes in contact with the hammer sear contact surface 282 of the disconnector element 206. However, the overlap or engagement of the hammer sear 266 with the trigger sear 306 has been reduced because the trigger element 208 has shifted in the direction R$_F$ relative to the hammer element 204. However, the hammer sear 266 is still engaged with the trigger sear 306 so as to be held by the trigger sear 306. The trigger element contact portion 284 of the disconnector element 206 remains contact with the disconnector pad 310 of the trigger element 208 due to the biasing force of the disconnector biasing member 224. In at least some embodiment, the hammer tail 254 can lose contact with the hammer pad 312 of the trigger element 208 as the trigger element 208 rotates away from the hammer tail 254.

The sear mechanism 120 is considered to be in the operation of a first stage trigger from the cocked position to the intermediate position. As the trigger 110 is pulled, the trigger element 208 and the disconnector element 206 rotates together around the second pivot support 214 in the first rotational direction R1 while overcoming resistance of the trigger biasing member 220. The trigger 110 has been pulled until the hammer sear 266 has contacted the hammer sear contact surface 282 of the disconnector element 206. At this point, the overlap of the hammer sear 266 with the trigger sear 306 has been reduced. In the intermediate position, a shooter will fell a distinct stop point where the hammer sear 266 is attempting to rotate the disconnector element 206 around the second pivot support 214 in a second rotational direction R2 opposite to the first rotational direction R1. The location of this stop point controls the amount of overlap left on the hammer sear 266 and the trigger sear 306, and marks the end of the first stage trigger operation. In at least one embodiment, the disconnector biasing member 224 and/or the trigger biasing member 220 can be selected to provide a predetermined amount of force required to pull the trigger 110 in the first stage. For example, the disconnector biasing member 224 and/or the trigger biasing member 220 can be selected to adjust the amount of resistance against which the trigger element 208 and/or the disconnector element 206 rotate from the cocked position to the intermediate position as the trigger 110 is pulled. In at least one embodiment, the predetermined amount of force or pressure at the first stage ranges from 1.0 lbs to 5.0 lbs. In other embodiments, the predetermined amount of force or pressure at the first trigger state can be about 2.5 lbs.

FIG. 10C illustrates that the sear mechanism 120 is at a release point. At the release point, the hammer sear 266 is disengaged from the trigger sear 306 as the trigger 110 is further pulled from the intermediate position. Only a slight amount of additional pressure on the trigger 110 will further rotate the trigger element 208 in the first rotational direction D1 while blocking the disconnector element 206 from rotating in the first rotational direction D1. As a result, a gap between the trigger sear 306 and the hammer sear contact surface 282 becomes larger so that the hammer sear 266 slips off the trigger sear 306, thereby allowing the hammer element 204 to rotate under the force of the hammer biasing member 226 and strike the firing pin of the bolt assembly 142, discharging the firearm 100, as illustrated in FIG. 10D.

The sear mechanism 120 is in the operation of a second stage trigger as the slight additional pressure is applied to the trigger 110 from the first stage trigger operation. To minimize the amount of the additional pressure, a minimal amount of overlap between the hammer sear 266 and the trigger sear 306 is desired. The second stage trigger operation allows the shooter to carefully align his or her sights on target and at the appropriate moment the slight additional pressure on the trigger 110 will allow the firearm 100 to discharge without disturbing the alignment of the firearm 100 sights. In at least one embodiment, the additional pressure or force required at the second trigger stage ranges from 1 lbs to 3 lbs. In other embodiments, the additional pressure or force at the second trigger stage can be set about 2 lbs.

Further, as in the first trigger stage, the disconnector biasing member 224 and/or the trigger biasing member 220 can be selected to adjust the amount of resistance against which the trigger element 208 and/or the disconnector element 206 rotate in the second trigger stage operation.

FIG. 10D illustrates that the sear mechanism 120 is in the released position. In the released position, the hammer element 204 has rotated by the force of the hammer biasing member 226 to strike the firing pin of the bolt assembly 142.

Figure 11:
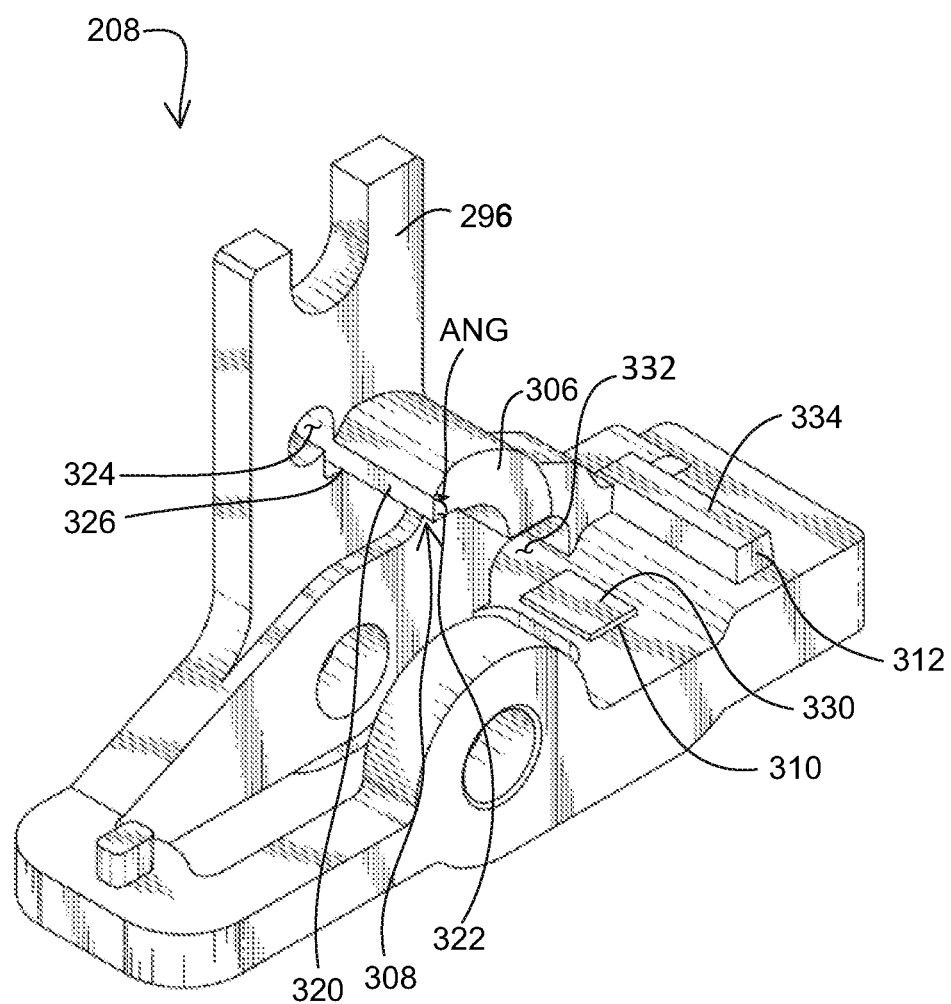
FIG. 11 is another perspective view of the trigger element of FIG. 8.
Figure 12:
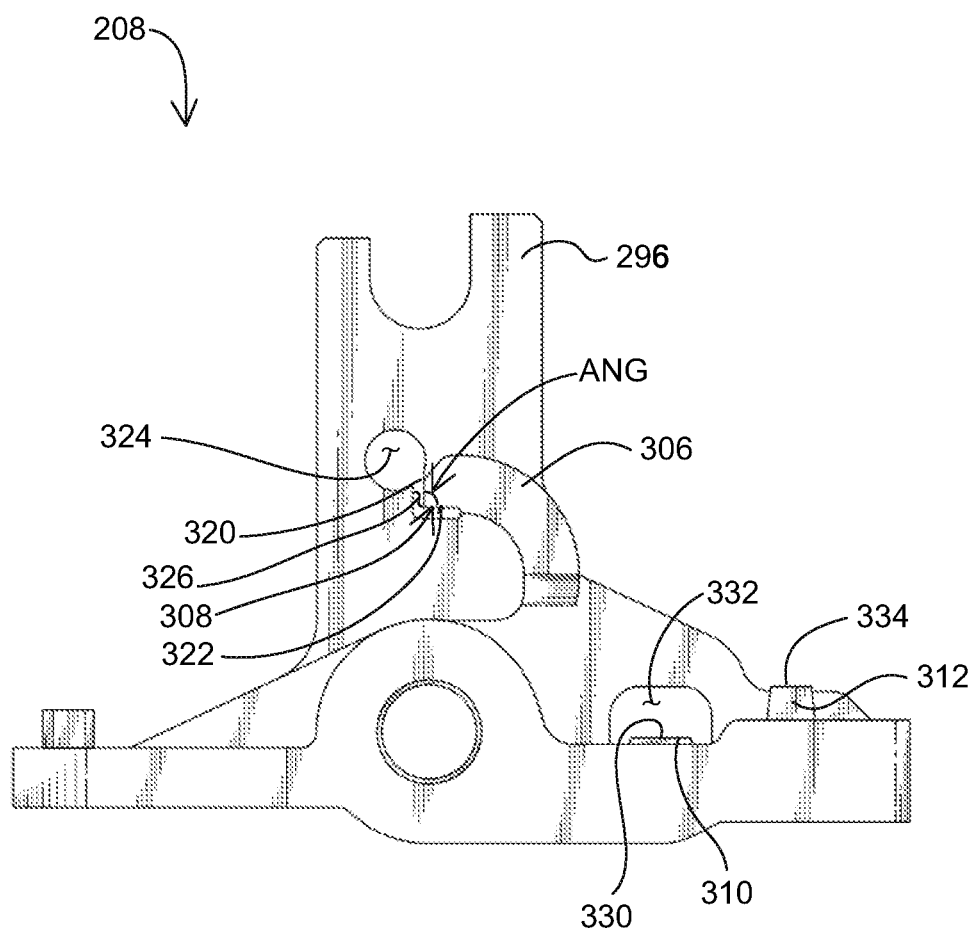
FIG. 12 is a front view of the trigger element of FIG. 8.
Figure 13:
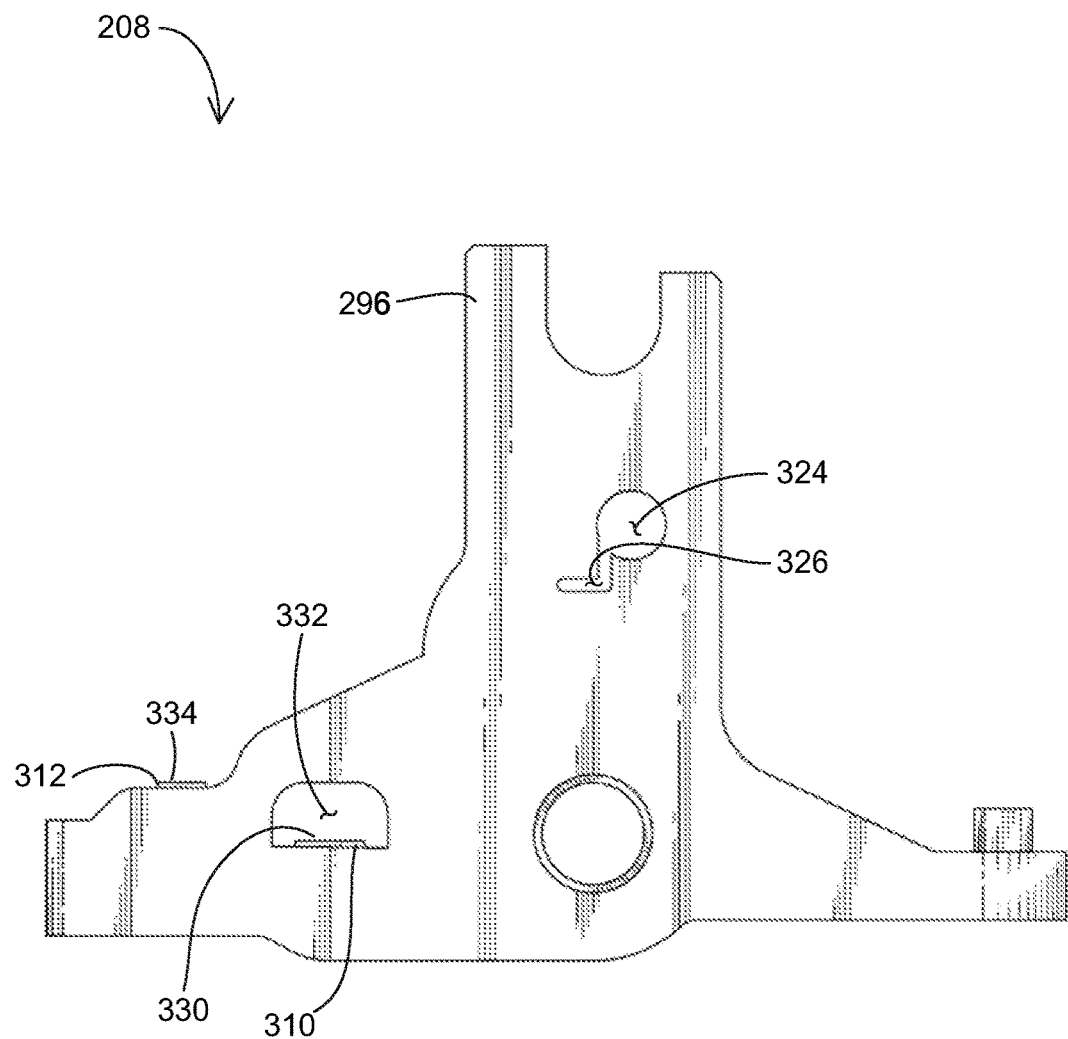
FIG. 13 is a rear view of the trigger element of FIG. 8.

FIGS. 11-13 illustrate the trigger element 208 of FIG. 8 again. In particular, FIG. 11 is another perspective view of the trigger element 208 of FIG. 8. FIG. 12 is a front view of the trigger element 208 of FIG. 8. FIG. 13 is a rear view of the trigger element 208 of FIG. 8.

As described above, the trigger element 208 includes the trigger sear 306 with the sear contact surface 308. In at least one embodiment, the sear contact surface 308 can include a first sear contact surface 320 and a second sear contact surface 322. The first and second sear contact surfaces 320 and 322 provide surfaces on which the first sear edge 268 of the hammer sear 266 slides as the hammer element 204 moves between the cocked position and the released position. In at least one embodiment, the first sear contact surface 320 can adjoin the second sear contact surface 322 at a predetermined angle ANG. The angle ANG defined by the first and second sear contact surfaces 320 and 322 can range between 70 and 110 degrees. In other embodiments, the angle ANG is approximately 90 degrees.

The trigger element 208 can further include a sear processing aperture 324 that is formed on the side wall 296 and designed to be used for machining the sear contact surface 308. In at least one embodiment, the sear processing aperture 324 is configured to engage a wire 446 (FIGS. 18, 20 and 22) of electric discharge machining, as described herein. In some embodiments, the sear processing aperture 324 can be arranged adjacent an edge of the trigger sear 306 so that the sear contact surface 308 is processed or machined at the edge of the trigger sear 306. As a result of the process or machining of the sear contact surface 308, a processing path 326 is formed on the side wall 296 along the sear contact surface 308. In the depicted embodiment, the processing path 326 is formed along the first and second sear contact surfaces 320 and 322 as the wire of electric discharge machining moves to process the first and second sear contact surfaces 320 and 322. In other embodiments, the sear processing aperture 324 is positioned away from the trigger sear 306 in the trigger element 208. Once the wire 446 is inserted through the sear processing aperture 324, the wire 446 in operation can cut through the trigger element 208 to reach the trigger sear 306 while forming a path connecting the sear processing aperture 324 and the trigger sear 306. Then, the wire 446 continuously forms the processing path 326 as it processes the first and second sear contact surfaces 320 and 322.

As described above, the trigger element 208 includes the disconnector pad 310. The disconnector pad 310 provides a disconnector contact surface 330 with which the trigger element contact portion 284 is selectively in contact. The disconnector pad 310 has a predetermined height from the base 294 of the trigger element 208 to determine the position of the disconnector element 206 relative to the trigger element 208. The accurate dimension (e.g., height) and smoothness of the disconnector pad 310 is critical to control the interaction between the hammer element 204, the disconnector element 206, and the trigger element 208, thereby the performance of the two-stage trigger operation of the sear mechanism 120.

The trigger element 208 can further include a disconnector pad processing aperture 332 that is formed on the side wall 296 and designed to be used for machining the disconnector contact surface 330. The disconnector pad processing aperture 332 can be arranged adjacent the disconnector pad 310 so that the disconnector contact surface 330 is machined on the disconnector pad 310. In other embodiments where the side wall 296 does not extend adjacent the disconnector pad 310, the trigger element 208 does not need the disconnector pad processing aperture 332 to machine the disconnector contact surface 330.

As described above, the trigger element 208 includes the hammer pad 312. The hammer pad 312 provides a hammer contact surface 334 on which the hammer tail 254 (e.g., the notch 262) slides. The hammer pad 312 has a predetermined height from the base 294 of the trigger element 208 to determine the position of the hammer element 204 relative to the trigger element 208. Similarly to the disconnector pad 310, the accurate dimension (e.g., height) and smoothness of the hammer pad 312 is critical to control the interaction between the hammer element 204, the disconnector element 206, and the trigger element 208, thereby the performance of the two-stage trigger operation of the sear mechanism 120.

Figure 14:
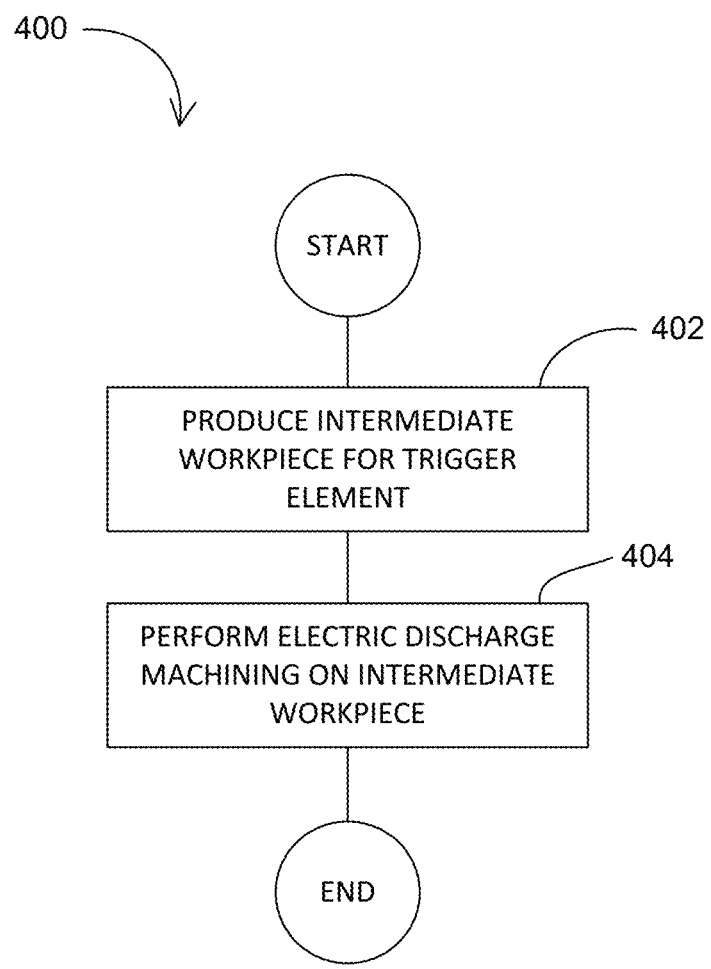
FIG. 14 illustrates an example method of manufacturing the trigger element.

FIG. 14 illustrates an example method 400 of manufacturing the trigger element 208. In at least one embodiment, the method 400 includes operations 402 and 404.

At the operation 402, an intermediate workpiece 408 (FIG. 15) for the trigger element 208 is produced. The intermediate workpiece 408 can be produced in various manufacturing processes. In some embodiment, the intermediate workpiece 408 is produced by casting. Casting is a manufacturing process by which a liquid material is poured into a mold. The mold is designed to contain a hollow cavity of the shape of the intermediate workpiece 408. Once the material is solidified in the mold, the casted product (i.e., the intermediate workpiece 408) is ejected out of the mold. In other embodiments, the intermediate workpiece 408 is manufactured by other processes, such as forging and machining.

At the operation 404, electric discharge machining (EDM) is performed on the intermediate workpiece 408 to produce the end product of the trigger element 208. In at least one embodiment, EDM is used to provide at least one contact surface onto which at least one pivotable or movable element (e.g., the hammer element 204 and/or the disconnector element 206) of the sear mechanism selectively contacts and/or slides. EDM is a manufacturing process by which a desired shape is obtained using electrical discharges or sparks. In at least one embodiment, the EDM can use two electrodes that are separated by a dielectric liquid and subject to an electric voltage. A series of rapidly recurring current discharges between the electrodes operates to remove at least some of the materials of a workpiece. In other embodiments, wire electrical discharge machining (WEDM) can be used to machine the intermediate workpiece 408 to produce the trigger element 208. The WEDM can typically use a thin single-strand metal wire 446, such as a brace wire, that is fed through a workpiece while the workpiece is submerged in a tank of dielectric fluid, such as deionized water.

As described herein, the EDM can be used primarily to create the sear contact surface 308, the disconnector contact surface 330, and the hammer contact surface 334.

Figure 15A:
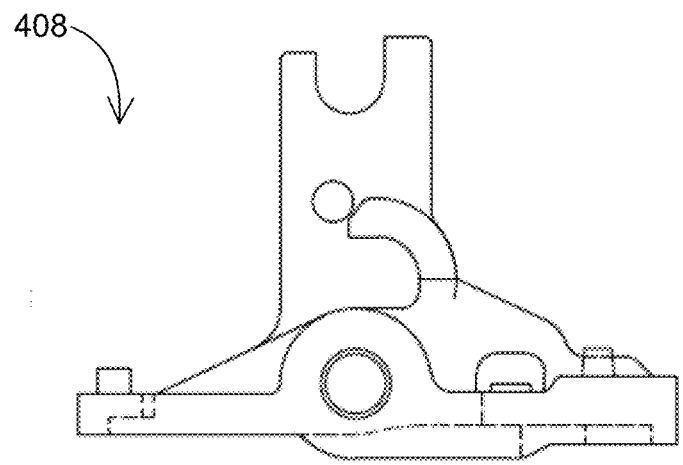
FIG. 15A is a side view of an example intermediate workpiece.
Figure 15B:
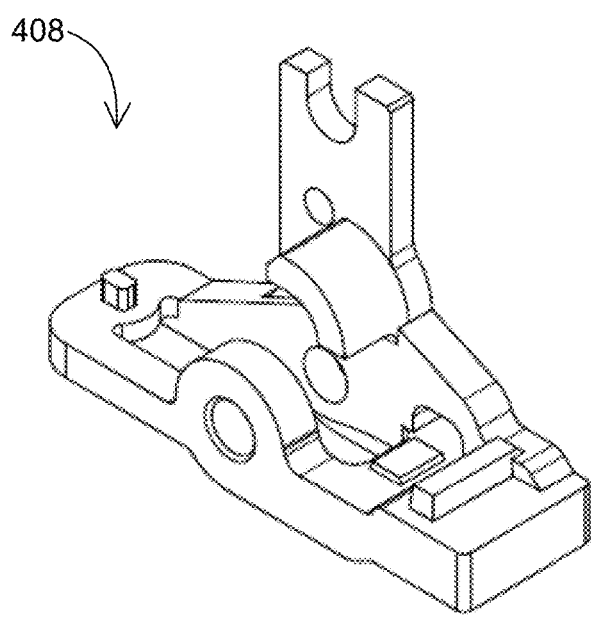
FIG. 15B is a perspective view of the intermediate workpiece of FIG. 15A.

FIGS. 15A and 15B illustrate an example intermediate workpiece 408 for the trigger element 208. In particular, FIG. 15A is a side view of an example intermediate workpiece 408, and FIG. 15B is a perspective view of the intermediate workpiece 408 of FIG. 15A.

As described in FIG. 14, the intermediate workpiece 408 can be produced by a manufacturing process, such as casting, forging, or machining. The intermediate workpiece 408 can include one or more unfinished portions that are to be machined in subsequent processes, such as the operation 402 in FIG. 14. In the illustrated example, the intermediate workpiece 408 does not have the sear contact surface 308 at the trigger sear 306, the disconnector contact surface 330 on the disconnector pad 310, and the hammer contact surface 334 on the hammer pad 312.

Figure 16:
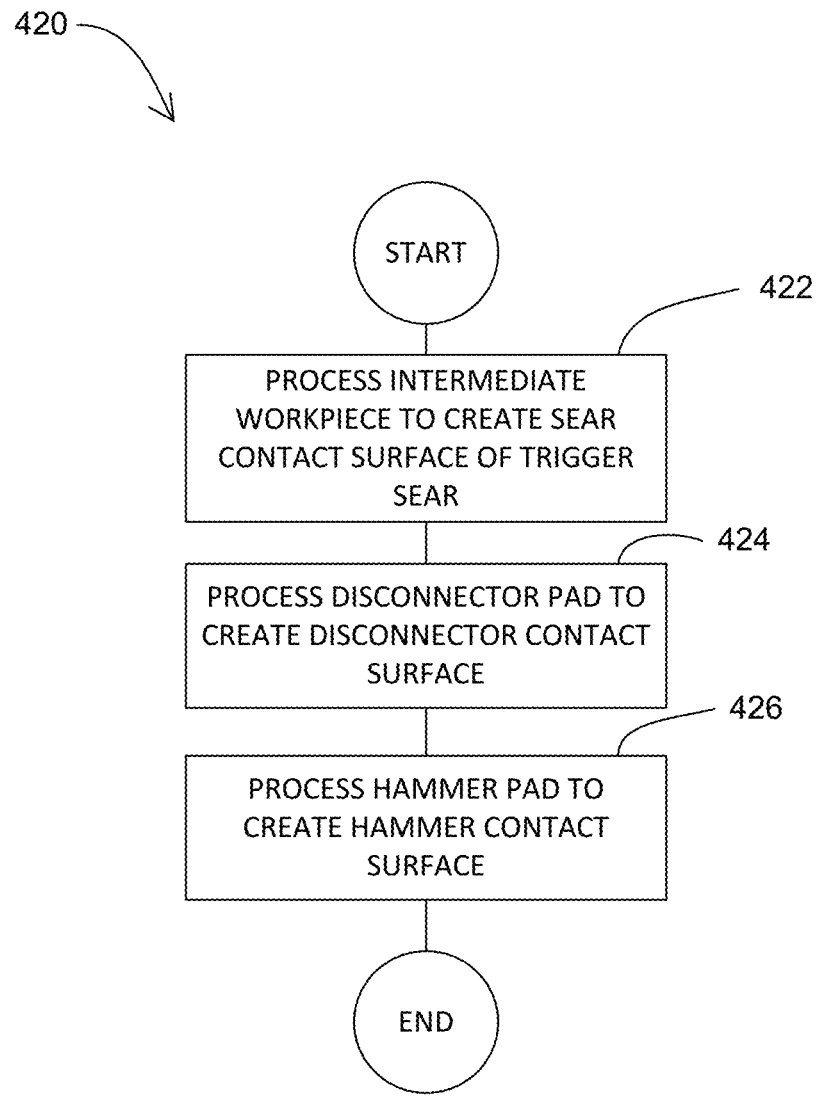
FIG. 16 illustrates an example method of performing an operation of FIG. 14.

FIG. 16 illustrates an example method 420 of performing the operation 404 of FIG. 14. In at least one embodiment, the method 420 includes operations 422, 424 and 426.

The method 420 is designed to machine the sear contact surface 308, the disconnector contact surface 330, and the hammer contact surface 334 to produce the trigger element 208.

At the operation 422, the cantilever trigger sear 306 is processed to create the sear contact surface 308. In at least one embodiment, EDM can be performed to provide the sear contact surface 308 at one end of the trigger sear 306.

At the operation 424, the disconnector pad 310 is processed to create the disconnector contact surface 330. In at least one embodiment, EDM can be performed to provide the disconnector contact surface 330 on the disconnector pad 310.

At the operation 426, the hammer pad 312 is processed to create the hammer contact surface 334. In at least one embodiment, EDM can be performed to provide the hammer contact surface 334 on the hammer pad 312.

In other embodiments, the method 420 can perform the operations 422, 424 and 426 in different order. The method 420 can also omit one or more of the operations 422, 424 and 426, or perform at least one of the operations 422, 424 and 426 with other operations.

Figure 17:
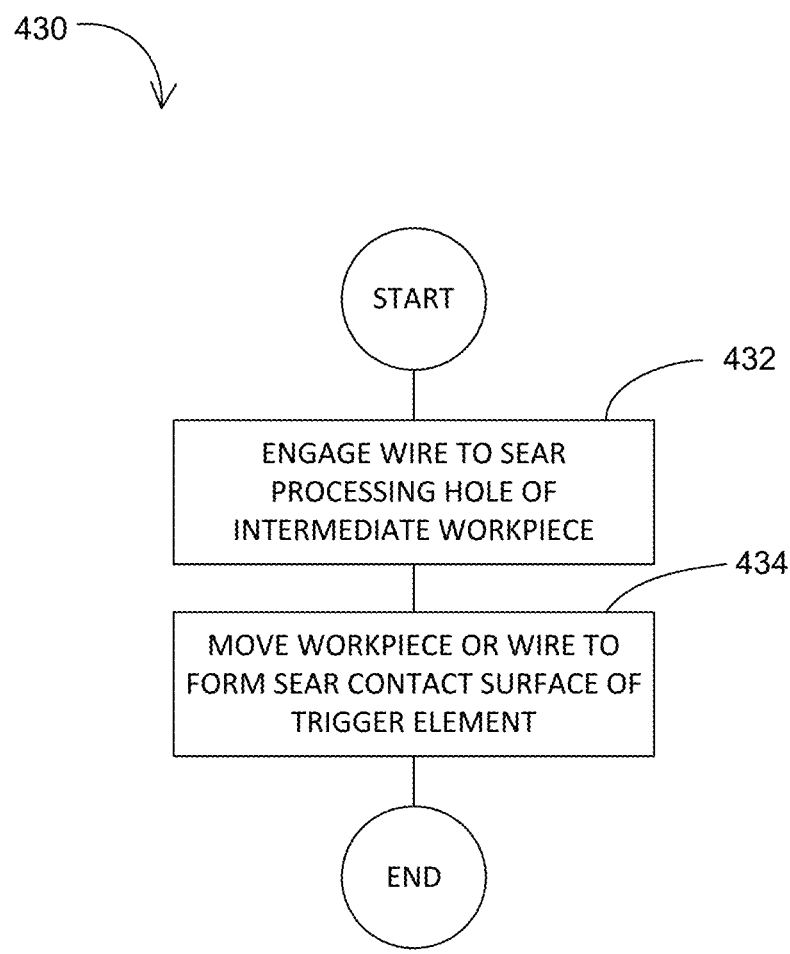
FIG. 17 illustrates an example method of performing an operation of FIG. 16.

FIG. 17 illustrates an example method 430 of performing the operation 422 of FIG. 16. In at least one embodiment, the method 430 includes operations 432 and 434.

The method 430 involves using wire electrical discharge machining (WEDM) to produce the sear contact surface 308. WEDM can use a metal wire 446 (FIG. 18) that is engaged through the intermediate workpiece 408 to create sparks between the metal wire 446 and a portion of the workpiece 408 abutting the wire 446 while the intermediate workpiece 408 is submerged in a tank of dielectric fluid. The sparks can cut the surface of the workpiece to form a desired shape.

At the operation 432, the wire 446 is engaged through the sear processing aperture 324 of the intermediate workpiece 408. The intermediate workpiece 408 can be submerged in a dielectric fluid and guided by a clamping device or work table.

At the operation 434, either the intermediate workpiece 408 or the wire 466 is moved relative to each other as necessary to form the sear contact surface 308. In the depicted embodiment, the intermediate workpiece 408 is continuously shifted in two different directions to create the first and second sear contact surfaces 320 and 322. In other embodiments, the worktable can be shifted to move the wire 466 relative to the intermediate workpiece 408 to create the sear contact surfaces 320 and 322. As the intermediate workpiece 408 is displaced to create the first and second sear contact surfaces 320 and 322, the processing path 326 is created along the first and second sear contact surfaces 320 and 322.

Figure 18:
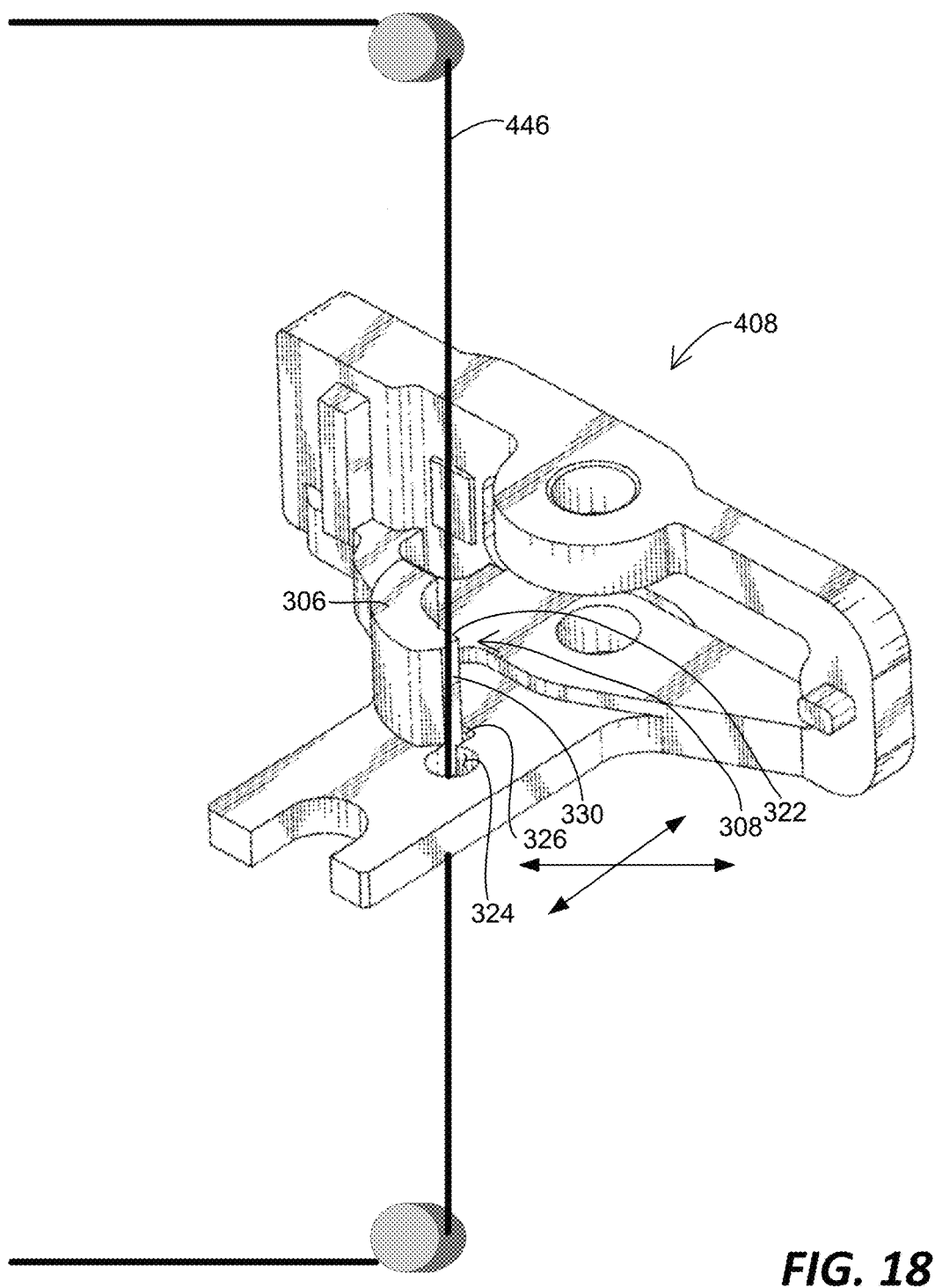
FIG. 18 schematically illustrates the method of FIG. 17.

FIG. 18 schematically illustrates the method 430 of FIG. 17. As illustrated, the wire 446 used in WEDM is engaged through the sear processing aperture 324. The intermediate workpiece 408 can be moved relative to the wire 446 in different directions (or vice versa) so that the sear contact surface 308 is created. Electric current flowing through the wire 446 subject to a predetermined voltage will cause sparks when the wire 446 abuts the trigger sear 306 and produce the sear contact surface 308 on the trigger sear 306.

Figure 19:
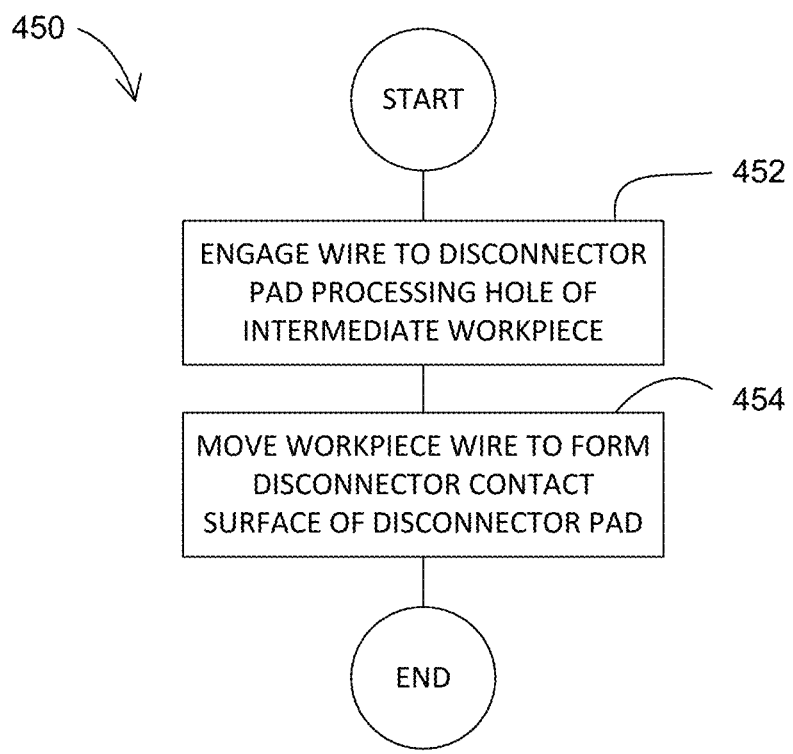
FIG. 19 illustrates an example method of performing an operation of FIG. 16.

FIG. 19 illustrates an example method 450 of performing the operation 424 of FIG. 16. In at least one embodiment, the method 450 includes operations 452 and 454.

At the operation 452, the wire 446 is engaged through the disconnector pad processing aperture 332 of the intermediate workpiece 408. The intermediate workpiece 408 can be submerged in a dielectric fluid and guided by a clamping device or work table.

At the operation 454, either the intermediate workpiece 408 or the wire 446 is moved as necessary to form the disconnector contact surface 330. In the depicted embodiment, the intermediate workpiece 408 is continuously shifted in two different directions to create the disconnector contact surface 330 on the disconnector pad 310. In other embodiments, the worktable can be shifted to move the wire 466 relative to the intermediate workpiece 408 to create the disconnector contact surface 330 on the disconnector pad 310.

Figure 20:
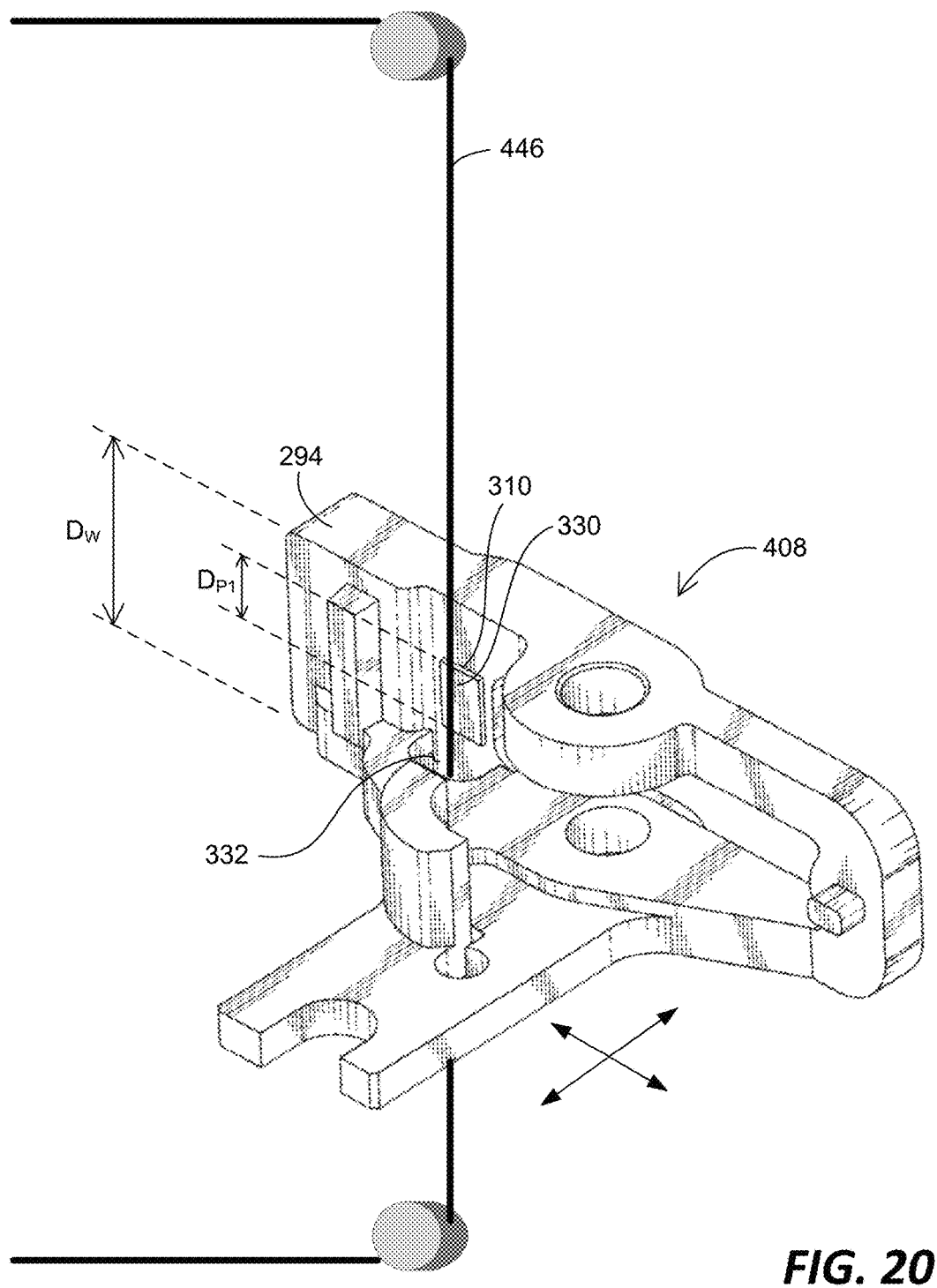
FIG. 20 schematically illustrates the method of FIG. 19.

FIG. 20 schematically illustrates the method 450 of FIG. 19. As illustrated, the wire 446 used in WEDM is engaged through the disconnector pad processing aperture 332. The intermediate workpiece 408 can be moved relative to the wire 446 in different directions (or vice versa) so that the disconnector contact surface 330 is created on the disconnector pad 310. Electric current flowing through the wire 446 subject to a predetermined voltage will cause sparks when the wire 446 abuts the disconnector pad 310 and produce the disconnector contact surface 330 thereon.

In at least one embodiments, the disconnector pad 310 is provided on the base 294 such that a width $D_{P1}$ of the disconnector pad 310 (in particular, a width of the disconnector contact surface 330) in the direction of the wire 446 is smaller than a width $D_W$ of the base 294 in the same direction. In some embodiments, the width $D_{P1}$ of the disconnector pad 310 is in a range from 0.1 to 0.9 times the width $D_W$ of the base 294. In other embodiments, the width $D_{P1}$ of the disconnector pad 310 is in a range from 0.2 to 0.6 times the width $D_W$ of the base 294. In yet other embodiments, the width $D_{P1}$ of the disconnector pad 310 is in a range from 0.3 to 0.4 times the width $D_W$ of the base 294. The disconnector pad 310 smaller than the base 294 in the direction along the wire 446 helps reducing a manufacturing time and increasing productivity of the EDM process. The principle of making the width $D_{P1}$ of the disconnector pad 310 smaller than the width $D_W$ of the base 294 can be used in various trigger designs other than the disconnector pad 310 of the trigger element 208 to achieve the decreased manufacturing time and increased productivity.

Figure 21:
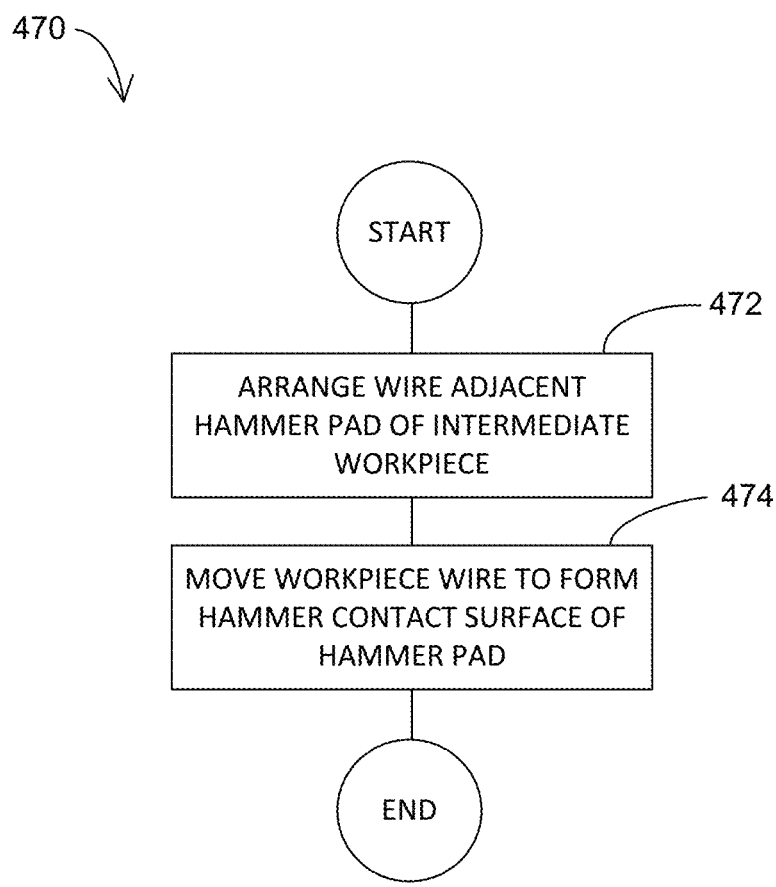
FIG. 21 illustrates an example method of performing an operation of FIG. 16.

FIG. 21 illustrates an example method 470 of performing the operation 426 of FIG. 16. In at least one embodiment, the method 470 includes operations 472 and 474.

At the operation 472, the wire 446 is arranged adjacent the hammer pad 312 of the intermediate workpiece 408. The intermediate workpiece 408 can be submerged in a dielectric fluid and guided by a clamping device or work table.

At the operation 474, either the intermediate workpiece 408 or the wire 446 is moved as necessary to form the hammer contact surface 334. In the depicted embodiment, the intermediate workpiece 408 is continuously shifted in two different directions to create the hammer contact surface 334 on the hammer pad 312. In other embodiments, the worktable can be shifted to move the wire 466 relative to the intermediate workpiece 408 to create the hammer contact surface 334 on the hammer pad 312.

Figure 22:
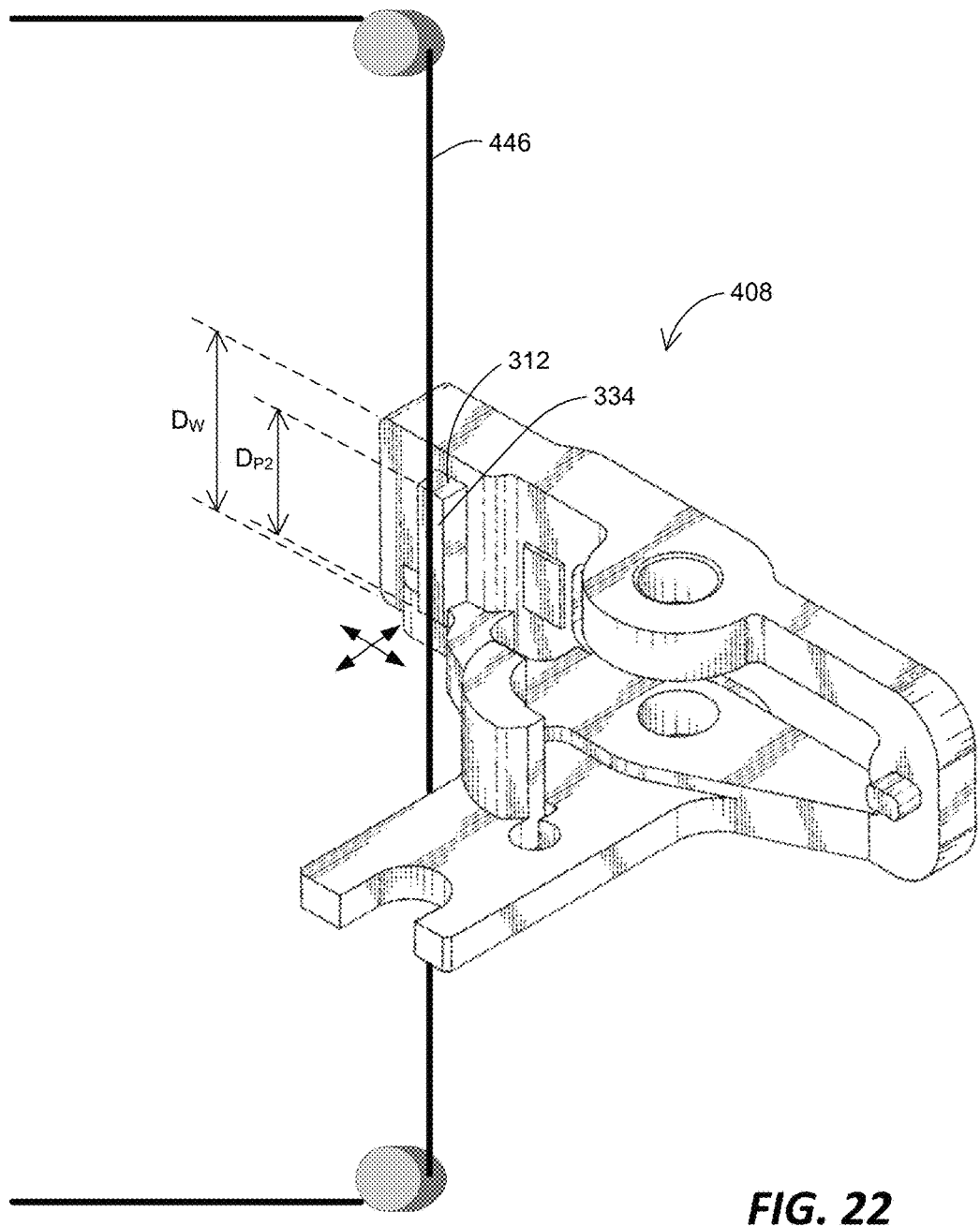
FIG. 22 schematically illustrates the method of FIG. 20.

FIG. 22 schematically illustrates the method 470 of FIG. 20. As illustrated, the wire 446 used in WEDM is arranged adjacent the hammer pad 312 so that the wire 446 substantially contacts the hammer pad 312. The intermediate workpiece 408 can be moved relative to the wire 446 in different directions (or vice versa) so that the hammer contact surface 334 is created on the hammer pad 312. Electric current flowing through the wire 446 subject to a predetermined voltage will cause sparks when the wire 446 abuts the hammer pad 312 and produce the hammer contact surface 334 thereon.

In at least some embodiments, the hammer pad 312 is provided on the base 294 such that a width $D_{P2}$ of the hammer pad 312 (in particular, a width of the hammer contact surface 334) in the direction of the wire 446 is smaller than the width $D_W$ of the base 294 in the same direction. In some embodiments, the width $D_2$ of the hammer pad 312 is in a range from 0.1 to 0.9 times the width $D_W$ of the base 294. In other embodiments, the width $D_{P2}$ of the hammer pad 312 is in a range from 0.3 to 0.8 times the width $D_W$ of the base 294. In yet other embodiments, the width $D_2$ of the hammer pad 312 is in a range from 0.5 to 0.7 times the width $D_W$ of the base 294. The hammer pad 312 smaller than the base 294 in the direction along the wire 446 helps reducing a manufacturing time and increasing productivity of the EDM process. The principle of making the width $D_{P1}$ of the hammer pad 312 smaller than the width $D_W$ of the base 294 can be used in various trigger designs other than the hammer pad 312 of the trigger element 208 to achieve the decreased manufacturing time and increased productivity.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A trigger element of a sear mechanism for a firearm, comprising:
   a sidewall,
   a sear processing aperture formed on the sidewall, and a trigger sear having at least one sear contact surface configured to contact a hammer sear of the trigger element;

wherein the at least one sear contact surface extends from both the sidewall and a perimeter of the sear processing aperture in a direction generally parallel to an axis of rotation of the trigger sear, and wherein the trigger sear and the sidewall form at least part of a single unitary piece.

2. The trigger element of claim 1, wherein the sear processing aperture is arranged adjacent to an edge of the trigger sear.

3. The trigger element of claim 1, further comprising a processing path formed on the sidewall of the trigger element.

4. The trigger element of claim 3, wherein the processing path follows at least a portion of the profile of the at least one sear contact surface.

5. The trigger element of claim 1, wherein the at least one sear contact surface includes a first sear contact surface and a second sear contact surface.

6. The trigger element of claim 5, wherein the first sear contact surface adjoins the second sear contact surface at an angle of 70° to 110°.

7. A firearm comprising the trigger element of claim 1.

8. The trigger element of claim 1, wherein the sear contact surface and the sear processing aperture are aligned so as to form a processing path for a substantially straight wire to pass through the sear processing aperture to the sear contact surface.

9. A trigger element of a sear mechanism for a firearm, comprising:

a sidewall, a sear processing aperture formed on the sidewall and having a continuous perimeter, and a trigger sear having at least one sear contact surface configured to contact a hammer sear of the trigger element;

wherein the at least one sear contact surface extends from the sidewall, and wherein the trigger sear and the sidewall form at least part of a single unitary piece.

10. A firearm comprising the trigger element of claim 9.

11. The trigger element of claim 1, wherein the sear contact surface further extends through the sear processing aperture.

12. The trigger element of claim 1, wherein the trigger sear is configured to engage a hammer sear.

* * * * *